United States Patent
Henry et al.

(10) Patent No.: US 11,208,348 B2
(45) Date of Patent: Dec. 28, 2021

(54) HALOGENATED POLYIMIDE SILOXANE CHEMICAL COMPOSITIONS AND GLASS ARTICLES WITH HALOGENATED POLYIMIDE SILOXANE LOW-FRICTION COATINGS

(71) Applicant: Corning Incorporated, Corning, NY (US)

(72) Inventors: David Henry, Fontaine le Port (FR); Valerie Claudine Lacarriere, Larchant (FR)

(73) Assignee: CORNING INCORPORATED, Corning, NY (US)

( * ) Notice: Subject to any disclaimer, the term of this patent is extended or adjusted under 35 U.S.C. 154(b) by 202 days.

(21) Appl. No.: 15/280,101

(22) Filed: Sep. 29, 2016

(65) Prior Publication Data
US 2017/0088459 A1    Mar. 30, 2017

(30) Foreign Application Priority Data

Sep. 30, 2015 (EP) .................................. 15290254

(51) Int. Cl.
*A61J 1/14* (2006.01)
*B65D 23/02* (2006.01)
(Continued)

(52) U.S. Cl.
CPC ............. *C03C 17/30* (2013.01); *A61J 1/1468* (2015.05); *B65D 23/02* (2013.01); *B65D 23/08* (2013.01);
(Continued)

(58) Field of Classification Search
CPC .... C08G 73/1039; C08G 73/1042–106; C08G 73/1007; C08G 73/10;
(Continued)

(56) References Cited

U.S. PATENT DOCUMENTS 2,644,802 A    7/1953   Lontz
2,691,548 A    10/1954   Feucht et al.
(Continued)

FOREIGN PATENT DOCUMENTS

CA           853121 A     10/1970
CA          1333785 C     1/1995
(Continued)

OTHER PUBLICATIONS

Non-Final Office Action dated Feb. 9, 2018, for U.S. Appl. No. 15/331,120, filed Oct. 21, 2016. pp. 1-26.
(Continued)

*Primary Examiner* — Lee E Sanderson
*Assistant Examiner* — Michael C Romanowski
(74) *Attorney, Agent, or Firm* — Dinsmore & Shohl LLP

(57) ABSTRACT

As described herein, a polyimide chemical composition may be used for coating glass articles. According to embodiments, a coated glass article may include a glass container which may include a first surface and a second surface opposite the first surface, and a low-friction coating bonded to at least a portion of the first surface of the glass container. The low-friction coating may include a polyimide chemical composition. The polyimide chemical composition may be halogenated and the polyimide chemical composition may include a siloxane moiety.

13 Claims, 12 Drawing Sheets

(51) Int. Cl.
  *C03C 17/30* (2006.01)
  *B65D 23/08* (2006.01)
  *C08G 73/10* (2006.01)
  *C03C 17/00* (2006.01)
  *C03C 17/32* (2006.01)
  *C08L 79/08* (2006.01)

(52) U.S. Cl.
  CPC ........ *B65D 23/0814* (2013.01); *C03C 17/005* (2013.01); *C03C 17/32* (2013.01); *C08G 73/106* (2013.01); *C08L 79/08* (2013.01); *C03C 2217/78* (2013.01); *C03C 2218/111* (2013.01); *Y10T 428/131* (2015.01); *Y10T 428/1321* (2015.01)

(58) Field of Classification Search
  CPC .. C08G 73/106; C09D 179/08; C03C 17/005; C03C 17/30; B65D 23/08; B65D 23/0807; B65D 23/0814; B65D 23/0821
  USPC .......... 528/401, 402, 10, 22; 428/34.4, 34.7
  See application file for complete search history.

(56) References Cited

U.S. PATENT DOCUMENTS

| | | |
|---|---|---|
| 3,179,634 A | 4/1965 | Edwards |
| 3,287,311 A | 11/1966 | Edwards |
| 3,323,889 A | 6/1967 | Carl et al. |
| 3,395,069 A | 7/1968 | Plueddemann |
| 3,441,432 A | 4/1969 | Levene |
| 3,445,267 A | 5/1969 | Layne |
| 3,577,256 A | 5/1971 | Benford, Jr. et al. |
| 3,607,186 A | 9/1971 | Bognar |
| 3,674,690 A | 7/1972 | Clow et al. |
| 3,772,061 A | 11/1973 | McCoy et al. |
| 3,791,809 A | 2/1974 | Lau |
| 3,801,361 A | 4/1974 | Kitaj |
| 3,811,921 A | 5/1974 | Crawford et al. |
| 3,819,346 A | 6/1974 | Southwick et al. |
| 3,844,754 A | 10/1974 | Grubb et al. |
| 3,878,960 A | 4/1975 | Jonsson et al. |
| 3,900,329 A | 8/1975 | Grubb et al. |
| 3,926,604 A | 12/1975 | Smay et al. |
| 3,958,073 A | 5/1976 | Trevisan et al. |
| 3,989,864 A | 11/1976 | Hey et al. |
| 4,030,904 A | 6/1977 | Battye et al. |
| 4,056,208 A | 11/1977 | Prejean |
| 4,056,651 A | 11/1977 | Scola |
| 4,065,317 A | 12/1977 | Baak et al. |
| 4,065,589 A | 12/1977 | Lenard et al. |
| 4,086,373 A | 4/1978 | Tobias et al. |
| 4,093,759 A | 6/1978 | Otsuki et al. |
| 4,130,677 A | 12/1978 | Huntsberger |
| 4,161,556 A | 7/1979 | Lenard et al. |
| 4,164,402 A | 8/1979 | Watanabe |
| 4,214,886 A | 7/1980 | Shay et al. |
| 4,215,165 A | 7/1980 | Gras et al. |
| 4,238,041 A | 12/1980 | Jönsson et al. |
| 4,264,658 A | 4/1981 | Tobias et al. |
| 4,280,944 A | 7/1981 | Satio et al. |
| 4,315,573 A | 2/1982 | Bradley et al. |
| 4,351,882 A | 9/1982 | Concannon |
| 4,385,086 A | 5/1983 | Nakayama et al. |
| 4,386,164 A | 5/1983 | Moser |
| 4,395,527 A | 7/1983 | Berger |
| 4,431,692 A | 2/1984 | Hofmann et al. |
| 4,558,110 A | 12/1985 | Lee |
| 4,595,548 A | 6/1986 | St. Clair et al. |
| 4,603,061 A | 7/1986 | St. Clair et al. |
| 4,620,985 A | 11/1986 | Goodburn et al. |
| 4,636,411 A | 1/1987 | Dubois et al. |
| 4,654,235 A | 3/1987 | Effenberger et al. |
| 4,668,268 A | 5/1987 | Lindner et al. |
| 4,680,373 A | 7/1987 | Gallagher et al. |
| 4,689,085 A | 8/1987 | Plueddemann |
| 4,696,994 A | 9/1987 | Nakajima et al. |
| 4,748,228 A | 5/1988 | Shoji et al. |
| 4,749,614 A | 6/1988 | Andrews et al. |
| 4,767,414 A | 8/1988 | Williams et al. |
| 4,778,727 A | 10/1988 | Tesoro et al. |
| 4,842,889 A | 6/1989 | Hu et al. |
| 4,860,906 A | 8/1989 | Pellegrini et al. |
| 4,880,895 A * | 11/1989 | Higashi .............. C08G 73/1032 528/173 |
| 4,882,210 A | 11/1989 | Romberg et al. |
| 4,902,106 A | 2/1990 | Dijon et al. |
| 4,923,960 A * | 5/1990 | Chen, Sr. ................ C08G 73/14 528/125 |
| 4,931,539 A | 6/1990 | Hayes |
| 4,961,976 A | 10/1990 | Hashimoto et al. |
| 4,961,996 A | 10/1990 | Carre et al. |
| 4,988,288 A | 1/1991 | Melgaard |
| 5,002,359 A | 3/1991 | Sayegh |
| 5,036,145 A | 7/1991 | Echterling et al. |
| 5,037,701 A | 8/1991 | Carre et al. |
| 5,049,421 A | 9/1991 | Kosh |
| 5,112,658 A | 5/1992 | Skutnik et al. |
| 5,114,757 A | 5/1992 | Linde et al. |
| 5,120,341 A | 6/1992 | Nozawa et al. |
| 5,124,618 A | 6/1992 | Ohtaka et al. |
| 5,137,751 A * | 8/1992 | Burgess .................. C08J 3/095 427/123 |
| 5,206,337 A * | 4/1993 | Takeda ................ C08G 77/455 528/313 |
| 5,209,981 A * | 5/1993 | Rojstaczer ........... C08G 73/106 428/447 |
| 5,230,429 A | 7/1993 | Etheredge, III |
| 5,232,783 A | 8/1993 | Pawar et al. |
| 5,246,782 A | 9/1993 | Kennedy et al. |
| 5,251,071 A | 10/1993 | Kusukawa et al. |
| 5,252,703 A | 10/1993 | Nakajima et al. |
| 5,258,487 A | 11/1993 | Okinoshima et al. |
| 5,281,690 A | 1/1994 | Flaim et al. |
| 5,286,527 A | 2/1994 | Blum et al. |
| 5,302,458 A | 4/1994 | Blum et al. |
| 5,306,537 A | 4/1994 | Gustafson et al. |
| 5,310,862 A | 5/1994 | Nomura et al. |
| 5,326,601 A | 7/1994 | Kawano et al. |
| 5,336,925 A | 8/1994 | Moss et al. |
| 5,337,537 A | 8/1994 | Soughan |
| 5,403,700 A | 4/1995 | Heller et al. |
| 5,476,692 A | 12/1995 | Ellis et al. |
| 5,482,768 A | 1/1996 | Kawasato et al. |
| 5,488,092 A | 1/1996 | Kausch et al. |
| 5,498,758 A | 3/1996 | Scholes et al. |
| 5,504,830 A | 4/1996 | Ngo et al. |
| 5,594,231 A | 1/1997 | Pellicori et al. |
| 5,601,905 A | 2/1997 | Watanabe et al. |
| 5,633,079 A | 5/1997 | Shoshi et al. |
| 5,736,251 A | 4/1998 | Pinchuk |
| 5,736,476 A | 4/1998 | Watzke et al. |
| 5,756,144 A | 5/1998 | Wolff et al. |
| 5,849,369 A | 12/1998 | Ogawa |
| 5,851,200 A | 12/1998 | Higashikawa et al. |
| 5,908,542 A | 6/1999 | Lee et al. |
| 5,916,632 A | 6/1999 | Mishina et al. |
| 5,938,919 A | 8/1999 | Najafabadi |
| 5,979,714 A | 11/1999 | Bleile et al. |
| 6,013,333 A | 1/2000 | Carson et al. |
| 6,046,758 A | 4/2000 | Brown et al. |
| 6,048,911 A | 4/2000 | Shustack et al. |
| 6,084,034 A | 7/2000 | Miyama et al. |
| 6,096,432 A | 8/2000 | Sakaguchi et al. |
| 6,156,435 A | 12/2000 | Gleason et al. |
| 6,214,429 B1 | 4/2001 | Zou et al. |
| 6,232,428 B1 | 5/2001 | Deets et al. |
| 6,277,950 B1 | 8/2001 | Yang et al. |
| 6,346,315 B1 | 2/2002 | Sawatsky |
| 6,358,519 B1 | 3/2002 | Waterman |
| 6,444,783 B1 | 9/2002 | Dodd et al. |
| 6,472,068 B1 | 10/2002 | Glass et al. |
| 6,482,509 B2 | 11/2002 | Buch-Rasmussen et al. |
| 6,561,275 B2 | 5/2003 | Glass et al. |

(56) References Cited

U.S. PATENT DOCUMENTS

| | | | |
|---|---|---|---|
| 6,586,039 B2 | 7/2003 | Heinz et al. | |
| 6,599,594 B1 | 7/2003 | Walther et al. | |
| 6,627,377 B1 | 9/2003 | Itatani et al. | |
| 6,627,569 B1 | 9/2003 | Naumann et al. | |
| 6,737,105 B2 | 5/2004 | Richard | |
| 6,797,396 B1 | 9/2004 | Liu et al. | |
| 6,818,576 B2 | 11/2004 | Ikenishi et al. | |
| 6,852,393 B2 | 2/2005 | Gandon | |
| 6,866,158 B1 | 3/2005 | Sommer et al. | |
| 6,921,788 B1 | 7/2005 | Izawa et al. | |
| 6,939,819 B2 | 9/2005 | Usui et al. | |
| 6,989,181 B2 | 1/2006 | Brandt | |
| 7,087,307 B2 | 8/2006 | Nagashima et al. | |
| 7,215,473 B2 | 5/2007 | Fleming | |
| 7,236,296 B2 | 6/2007 | Liu et al. | |
| 7,315,125 B2 | 1/2008 | Kass | |
| 7,470,999 B2 | 12/2008 | Saito et al. | |
| 7,569,653 B2 | 8/2009 | Landon | |
| 7,619,042 B2 | 11/2009 | Poe et al. | |
| 7,845,346 B2 | 12/2010 | Langford et al. | |
| 7,871,554 B2 | 1/2011 | Oishi et al. | |
| 7,985,188 B2 | 7/2011 | Felts et al. | |
| 8,048,938 B2 | 11/2011 | Poe et al. | |
| 8,053,492 B2 | 11/2011 | Poe et al. | |
| 8,110,652 B2 | 2/2012 | Bito et al. | |
| 8,234,883 B2 | 8/2012 | Krall, Jr. et al. | |
| 8,273,801 B2 | 9/2012 | Baikerikar et al. | |
| 8,277,945 B2 | 10/2012 | Anderson et al. | |
| 8,309,627 B2 | 11/2012 | Poe et al. | |
| 8,324,304 B2 | 12/2012 | Burch et al. | |
| 8,518,545 B2 | 8/2013 | Akiba et al. | |
| 9,034,442 B2 | 5/2015 | Chang et al. | |
| 9,428,302 B2 | 8/2016 | Fadeev et al. | |
| 2002/0016438 A1* | 2/2002 | Sugo | C08L 79/08 528/332 |
| 2002/0037943 A1 | 3/2002 | Madsen | |
| 2002/0081401 A1 | 6/2002 | Hessok et al. | |
| 2002/0155216 A1 | 10/2002 | Reitz et al. | |
| 2002/0182410 A1 | 12/2002 | Szum et al. | |
| 2003/0031799 A1 | 2/2003 | Haque | |
| 2003/0072932 A1 | 4/2003 | Gandon | |
| 2004/0048997 A1 | 3/2004 | Sugo | |
| 2004/0096588 A1 | 5/2004 | Brandt | |
| 2004/0105985 A1 | 6/2004 | Henze et al. | |
| 2004/0199138 A1 | 10/2004 | McBay et al. | |
| 2005/0009953 A1 | 1/2005 | Shea | |
| 2005/0048297 A1 | 3/2005 | Fukuda et al. | |
| 2005/0170722 A1 | 8/2005 | Keese | |
| 2006/0099360 A1 | 5/2006 | Farha | |
| 2006/0233675 A1 | 10/2006 | Stein | |
| 2007/0082135 A1 | 4/2007 | Lee | |
| 2007/0116907 A1 | 5/2007 | Landon et al. | |
| 2007/0157919 A1 | 7/2007 | Marandon | |
| 2007/0178256 A1 | 8/2007 | Landon | |
| 2007/0187280 A1 | 8/2007 | Haines et al. | |
| 2007/0224427 A1 | 9/2007 | Kunita et al. | |
| 2007/0225823 A1 | 9/2007 | Hawkins et al. | |
| 2007/0289492 A1 | 12/2007 | Wynne et al. | |
| 2007/0293388 A1 | 12/2007 | Zuyev et al. | |
| 2008/0008838 A1 | 1/2008 | Arpac et al. | |
| 2008/0069970 A1 | 3/2008 | Wu | |
| 2008/0071228 A1 | 3/2008 | Wu et al. | |
| 2008/0114096 A1 | 5/2008 | Qu et al. | |
| 2008/0121621 A1 | 5/2008 | Stockum et al. | |
| 2008/0199618 A1 | 8/2008 | Wen et al. | |
| 2008/0214777 A1 | 9/2008 | Poe | |
| 2008/0281260 A1 | 11/2008 | William et al. | |
| 2008/0292496 A1 | 11/2008 | Madsen | |
| 2009/0048537 A1 | 2/2009 | Lydon et al. | |
| 2009/0092759 A1 | 4/2009 | Chen et al. | |
| 2009/0126404 A1 | 5/2009 | Sakhrani et al. | |
| 2009/0155490 A1 | 6/2009 | Bicker et al. | |
| 2009/0155506 A1 | 6/2009 | Martin et al. | |
| 2009/0155570 A1 | 6/2009 | Bonnet et al. | |
| 2009/0162530 A1 | 6/2009 | Nesbitt | |
| 2009/0162664 A1 | 6/2009 | Ou | |
| 2009/0176108 A1 | 7/2009 | Toyama et al. | |
| 2009/0197048 A1 | 8/2009 | Amin et al. | |
| 2009/0197088 A1 | 8/2009 | Murata | |
| 2009/0197390 A1 | 8/2009 | Rothwell et al. | |
| 2009/0203929 A1 | 8/2009 | Hergenrother et al. | |
| 2009/0208175 A1 | 8/2009 | Hongo et al. | |
| 2009/0208657 A1 | 8/2009 | Siebenlist et al. | |
| 2009/0239759 A1 | 9/2009 | Balch | |
| 2009/0247699 A1 | 10/2009 | Buehler et al. | |
| 2009/0269597 A1 | 10/2009 | Bito et al. | |
| 2009/0275462 A1 | 11/2009 | Murata | |
| 2009/0286058 A1 | 11/2009 | Shibata et al. | |
| 2009/0297857 A1 | 12/2009 | Pascal et al. | |
| 2009/0325776 A1 | 12/2009 | Murata | |
| 2010/0044268 A1 | 2/2010 | Haines et al. | |
| 2010/0047521 A1 | 2/2010 | Amin et al. | |
| 2010/0056666 A1 | 3/2010 | Poe et al. | |
| 2010/0062188 A1 | 3/2010 | Miyamoto et al. | |
| 2010/0063244 A1 | 3/2010 | Poe et al. | |
| 2010/0087307 A1 | 4/2010 | Murata et al. | |
| 2010/0101628 A1 | 4/2010 | Poe et al. | |
| 2010/0249309 A1 | 9/2010 | Lewin et al. | |
| 2010/0264645 A1 | 10/2010 | Jones et al. | |
| 2010/0273019 A1 | 10/2010 | Kitaike et al. | |
| 2010/0317506 A1 | 12/2010 | Fechner et al. | |
| 2011/0014475 A1 | 1/2011 | Murata | |
| 2011/0045219 A1 | 2/2011 | Stewart et al. | |
| 2011/0062619 A1 | 3/2011 | Laine et al. | |
| 2011/0065576 A1 | 3/2011 | Campbell et al. | |
| 2011/0091732 A1 | 4/2011 | Lu et al. | |
| 2011/0098172 A1 | 4/2011 | Brix | |
| 2011/0159318 A1 | 6/2011 | Endo et al. | |
| 2011/0177252 A1 | 7/2011 | Kanagasabapathy et al. | |
| 2011/0177987 A1 | 7/2011 | Lenting et al. | |
| 2011/0189486 A1 | 8/2011 | Wendell, Jr. | |
| 2011/0200805 A1 | 8/2011 | Tomamoto et al. | |
| 2011/0226658 A1 | 9/2011 | Tata-Venkata et al. | |
| 2011/0272322 A1 | 11/2011 | Yamagata et al. | |
| 2011/0274916 A1 | 11/2011 | Murata | |
| 2011/0313363 A1 | 12/2011 | D'Souza et al. | |
| 2012/0016076 A1 | 1/2012 | Kim et al. | |
| 2012/0034435 A1 | 2/2012 | Borrelli et al. | |
| 2012/0052293 A1 | 3/2012 | Poe et al. | |
| 2012/0052302 A1 | 3/2012 | Matusick et al. | |
| 2012/0061342 A1 | 3/2012 | Perrot | |
| 2012/0088888 A1* | 4/2012 | Nagao | C07C 229/18 525/420 |
| 2012/0097159 A1 | 4/2012 | Iyer et al. | |
| 2012/0107174 A1 | 5/2012 | Zambaux | |
| 2012/0142829 A1 | 6/2012 | Ichinose | |
| 2012/0148770 A1 | 6/2012 | Rong et al. | |
| 2012/0172519 A1 | 7/2012 | Dörr et al. | |
| 2012/0199203 A1 | 8/2012 | Nishizawa et al. | |
| 2012/0251748 A1 | 10/2012 | Ashmead et al. | |
| 2012/0282449 A1 | 11/2012 | Gross | |
| 2013/0011650 A1 | 1/2013 | Akiba et al. | |
| 2013/0071078 A1 | 3/2013 | Bennett et al. | |
| 2013/0095261 A1 | 4/2013 | Ahn et al. | |
| 2013/0101792 A1 | 4/2013 | Pranov | |
| 2013/0171456 A1* | 7/2013 | Fadeev | C03C 17/42 428/429 |
| 2013/0211344 A1 | 8/2013 | Rodriguez et al. | |
| 2013/0287755 A1 | 10/2013 | Greene et al. | |
| 2013/0299380 A1 | 11/2013 | Zambaux et al. | |
| 2014/0031499 A1 | 1/2014 | Cho et al. | |
| 2014/0001143 A1 | 2/2014 | Adib et al. | |
| 2014/0034544 A1* | 2/2014 | Chang | B65D 25/14 206/524.3 |
| 2014/0069202 A1 | 3/2014 | Fisk | |
| 2014/0150499 A1 | 6/2014 | Danielson et al. | |
| 2014/0151370 A1 | 6/2014 | Chang et al. | |
| 2014/0220327 A1 | 8/2014 | Adib et al. | |
| 2014/0323800 A1 | 10/2014 | Dye | |
| 2014/0339194 A1 | 11/2014 | Gu et al. | |
| 2015/0203631 A1 | 7/2015 | Miyazaki et al. | |

(56) References Cited

U.S. PATENT DOCUMENTS

| | | | |
|---|---|---|---|
| 2016/0145150 A1 | 5/2016 | Bookbinder et al. | |
| 2019/0210768 A1 | 7/2019 | Adib et al. | |

FOREIGN PATENT DOCUMENTS

| | | | |
|---|---|---|---|
| CN | 2483332 | Y | 3/2002 |
| CN | 1963650 | A | 5/2007 |
| CN | 101190969 | A | 6/2008 |
| CN | 101479355 | A | 7/2009 |
| CN | 101585666 | A | 11/2009 |
| CN | 201390409 | Y | 1/2010 |
| CN | 201404453 | Y | 2/2010 |
| CN | 101717189 | A | 6/2010 |
| CN | 101831175 | A | 9/2010 |
| CN | 201694531 | U | 1/2011 |
| CN | 102050572 | A | 5/2011 |
| CN | 102066462 | A | 5/2011 |
| CN | 202006114 | U | 10/2011 |
| CN | 102317168 | A | 1/2012 |
| CN | 103562324 | A | 2/2014 |
| CN | 104194618 | A | 12/2014 |
| DE | 1167706 | B | 4/1964 |
| DE | 1954314 | A1 | 5/1971 |
| DE | 4128634 | A1 | 3/1993 |
| DE | 4130414 | A1 | 4/1993 |
| DE | 29702816 | U1 | 4/1997 |
| DE | 102004011009 | A1 | 9/2005 |
| EP | 0176062 | A2 | 4/1986 |
| EP | 0330456 | A1 | 8/1989 |
| EP | 0515801 | A1 | 12/1992 |
| EP | 1464631 | A2 | 6/2004 |
| EP | 2031124 | A1 | 3/2009 |
| EP | 0524802 | B2 | 10/2009 |
| EP | 2540682 | A1 | 1/2013 |
| FR | 93015 | E | 1/1969 |
| FR | 2033431 | A5 | 12/1970 |
| FR | 2973804 | A1 | 10/2012 |
| GB | 702292 | A | 1/1954 |
| GB | 720778 | A | 12/1954 |
| GB | 966731 | A | 8/1964 |
| GB | 1267855 | A | 3/1972 |
| GB | 1529386 | A | 10/1978 |
| IN | 231117 | B | 3/2009 |
| JP | S49115088 | A | 11/1974 |
| JP | S5663845 | A | 5/1981 |
| JP | 56155044 | A | 12/1981 |
| JP | S5738346 | A | 3/1982 |
| JP | S57123223 | A | 7/1982 |
| JP | S58156553 | A | 9/1983 |
| JP | 60254022 | A | 12/1985 |
| JP | S6147932 | A | 3/1986 |
| JP | 62047623 | A | 3/1987 |
| JP | S6268828 | A | 3/1987 |
| JP | 62140257 | A | 6/1987 |
| JP | S62172081 | A | 7/1987 |
| JP | S63270330 | A | 11/1988 |
| JP | H01201047 | A | 8/1989 |
| JP | 1279058 | A | 11/1989 |
| JP | H02225344 | A | 9/1990 |
| JP | H05213631 | A | 8/1993 |
| JP | 7223845 | A | 8/1995 |
| JP | H083510 | A | 1/1996 |
| JP | H08151564 | A | 6/1996 |
| JP | 11171593 | A | 6/1999 |
| JP | 11314931 | A | 11/1999 |
| JP | 2000211644 | A | 8/2000 |
| JP | 2000219621 | A | 8/2000 |
| JP | 2001033348 | A | 2/2001 |
| JP | 2001072441 | A | 3/2001 |
| JP | 2001180969 | A | 7/2001 |
| JP | 2001192239 | A | 7/2001 |
| JP | 2001229526 | A | 8/2001 |
| JP | 2001236634 | A | 8/2001 |
| JP | 2001302284 | A | 10/2001 |
| JP | 2002003241 | A | 1/2002 |
| JP | 2002249340 | A | 9/2002 |
| JP | 2003053259 | A | 2/2003 |
| JP | 2003146699 | A | 5/2003 |
| JP | 2004161993 | A | 6/2004 |
| JP | 2006100379 | A | 4/2006 |
| JP | 2006291049 | A | 10/2006 |
| JP | 2007204728 | A | 8/2007 |
| JP | 2008195602 | A | 8/2008 |
| JP | 2009108181 | A | 5/2009 |
| JP | 2009523105 | A | 6/2009 |
| JP | 2009207618 | A | 9/2009 |
| JP | 2010059038 | A | 3/2010 |
| JP | 4483331 | B2 | 6/2010 |
| JP | 2012224824 | A | 11/2012 |
| JP | 2013003310 | A | 1/2013 |
| KR | 1006303090000 | | 9/2006 |
| RO | 83460 | A2 | 3/1984 |
| RU | 2071492 | C1 | 1/1997 |
| RU | 2220219 | C1 | 12/2003 |
| RU | 2514939 | C2 | 5/2014 |
| SU | 504719 | A1 | 2/1976 |
| SU | 990700 | A1 | 1/1983 |
| TW | 201034993 | A | 10/2010 |
| TW | 201113233 | A | 4/2011 |
| TW | 201213260 | A | 4/2012 |
| TW | 201223895 | A | 6/2012 |
| WO | 1990005031 | A1 | 5/1990 |
| WO | 1995010487 | A1 | 4/1995 |
| WO | 1997025932 | A1 | 7/1997 |
| WO | 2001017569 | A2 | 3/2001 |
| WO | 2007097376 | A | 8/2007 |
| WO | 2008050500 | A1 | 5/2008 |
| WO | 2009002660 | A2 | 12/2008 |
| WO | 2009028862 | A1 | 3/2009 |
| WO | 2009095569 | A1 | 8/2009 |
| WO | 2010115728 | A2 | 10/2010 |
| WO | 2010129758 | A1 | 11/2010 |
| WO | 2011001501 | A1 | 1/2011 |
| WO | 2011047840 | A2 | 4/2011 |
| WO | 2011069338 | A1 | 6/2011 |
| WO | 2011073106 | A1 | 6/2011 |
| WO | 2011080543 | A1 | 7/2011 |
| WO | 2011103798 | A1 | 9/2011 |
| WO | 2012047950 | A1 | 4/2012 |
| WO | 2013063290 | A1 | 5/2013 |
| WO | 2013130724 | A2 | 9/2013 |
| WO | 2014005030 | A1 | 1/2014 |
| ZA | 9706079 | A | 3/1998 |

OTHER PUBLICATIONS

FIOLAX clear technical data sheet acquired from http://www.us.schott.com/d/tubing/7c1860b0-5313-4d48-a12f-fa1ac06bc4a9/schott-tubing-datasheet-fiolax-clear-english.pdf. Originally published online Feb. 2010. pp. 1-3.
International Search Report & Written Opinion dated Dec. 9, 2016, for PCT/US2016/054384 filed Sep. 29, 2016. pp. 1-10.
International Search Report and Written Opinion dated Feb. 7, 2017, for PCT/US2016/059446 filed Oct. 28, 2016. pp. 1-10.
Notice of Allowance dated Nov. 7, 2017, for U.S. Appl. No. 13/780,754. pp. 1-14.
Liu et al., "Influences of heating temperature on mechanical properties of polydimethylsiloxane", Sensors and Actuators A: Physical, 2009, vol. 151, p. 42-45.
Russian Decision of Grant dated Nov. 8, 2017, for RU Patent Application No. 2014138998. pp. 1-20.
Korean 1st Office Action and English Translation dated Dec. 14, 2017, for KR Patent Application No. 2015-7017413. pp. 1-10.
Anderson, et al., "Polyimide-Substrate Bonding Studies Using γ-APS Coupling Agent", IEEE Transactions on Components, Hybrids, and Manufacturing Technology, vol. CHMT-9, No. 4, p. 364-369, Dec. 1986.
Benitez, et al., "SiOx—SiNx functional coatings by PECVD of organosilicon monomers other than silane", Annual Technical Conference Proceedings—Society of Vacuum Coaters (2002), 45th, 280-285; ISSN: 0731-1699.

(56) References Cited

OTHER PUBLICATIONS

Cho, et al. "Adhesion behavior of PDMS-containing polyimide to glass", Journal of Adhesion Science and Technology 12:3, pp. 253-269, Taylor & Francis (1998), DOI: 10.1163/156856198X00867.
Dow Corning, "A Guide to Silane Solutions: Fiberglass and Composites", Silicones Simplified [online], Dow Corning Corporation, 2009. Retrieved from the Internet: <URL: https://www.xiameter.com/en/ExploreSilicones/Documents/95-728-01%20Fiberglass%20and%20Composites.pdf>.
Dow Corning, Resins and Intermediates Selection Guide; Paints & Inks Solutions, p. 1-8, 2010.
"DuPont Teflon PFA TE-7224 Aqueous Fluoropolymers made with Echelon Dispersion Technology" [online]. Dupont, 2006. Retrieved from the Internet: <URL: http://www2.dupont.com/Teflon_Industrial/en_US/assets/downloads/k15758.pdf>.
Francen, et al., "Fluorochemical glass treatments", The Glass Industry (1965), 46(10), 594-7; 628-9; ISSN: 0017-1026.
G. L. Witucki, "A Silane Primer: Chemistry and Applications of Alkoxy Silanes", Journal of Coatings Technology, (vol. 65) pp. 57-60, Federation of Societies for Coatings Technology, Blue Bell, Pennsylvania (Jul. 1993).
Gelest, Inc., MSDS, Material Safety Data Sheet, Aminopropylsilsesquioxane Oligomer, 22-25%—WSA-9911 [online], Gelest, Inc. Morrisville, PA, 2008. Retrieved from the Internet: <URL: http://shop.gelest.com/Product.aspx?catnum=WSA-9911&Index=0&TotalCount=1>.
Iacocca, et al., "Factors Affecting the Chemical Durability of Glass Used in the Pharmaceutical Industry", AAPS PharmSciTech, vol. 11, No. 3, pp. 1340-1349, Sep. 2010.
Jin, et al., "Preparation and characterization of poly(phthalazinone ether ketone)/SiO2 hybrid composite thin films with low friction coefficient", Journal of Sol-Gel Science and Technology, Springer Science+Business Media, LLC (2008), 46(2), 208-216; ISSN: 0928-0707.
Jin, et al., "Preparation and investigation of the tribological behavior of poly(phthalazinone ether keytone)/silica thin films", Chinese Journal of Materials Research. vol. 22, No. 1, pp. 26-30. Feb. 25, 2008. ISSN: 1005-3093. Published by: Chinese Academy of Sciences, No. 1, Beijing, China.
"Thermal Stability of the Silica-Aminopropylsilane-Polyimide Interface", Linde, et al. Journal of Polymer Science, Polymer Chemistry Edition, vol. 22, 3043-3062, John Wiley & Sons, Inc. (1984).
Metwalli et al., Journal of Colloid and Interface Science 298 (2006) 825-831.
Poe, et al., "Zero CTE polyimides for athermal optical membranes", Proceedings of SPIE, vol. 7061, Issue: Novel Optical Systems Design and Optimization XI, pp. 706114/1-706114/9, Journal, 2008, Publisher: Society of Photo-Optical Instrumentation Engineers, ISSN: 0277-786X.
Schmid, et al. "Recommendations on Delamination Risk Mitigation & Prediction for Type I Pharmaceutical Containers Made of Tubing Glass", Nuova Ompi: Glass Division, p. 40-42., 2012, Frederick Furness Publishing.
Schmid, et al., "Glass Delamination: Facts—Prevention—Recommendations", Stevanato Group Market Update, News Issue 5, May 2011, p. 1-4.
Smay, G. L., "The characteristics of high-temperature resistant organic polymers and the feasibility of their use as glass coating materials", Journal of Materials Science, 20 (4), pp. 1494-1500, Chapman & Hall Ind. (1985), ISSN: 0022-2461.
Wahab, et al., "Silica- and Silsesquioxane-Containing Polymer Nanohybrids", Macromolecules Containing Metal and Metal-Like Elements, vol. 4: Group IVA Polymers, Chapter 6, 2005 John Wiley & Sons, Inc.
"Spectroscopic Ellipsometry Methods for Thin Absorbing Coatings", by Hilfiker et al. from Society of Vacuum Coaters 505/856-7188, pp. 511-516, 51st Annual Technical Conference Proceedings, Chicago, IL, (Apr. 19-24, 2008).
Non-Final Office Action dated Jul. 30, 2013 relating to U.S. Appl. No. 13/780,740, filed Feb. 28, 2013. pp. 1-34.
International Search Report & Written Opinion relating to PCT/US2013/028187 filed Feb. 28, 2013; dated Oct. 28, 2013.
Huang, et al., "Cubic silsesquioxane-polymide nanocomposites with improved thermomerchanical and dielectric properties", Acta Materialia, Elsevier, vol. 53, No. 8, pp. 2395-2404, May 1, 2005; ISSN: 1359-6454.
Andreica V. et al., "High acid resistance packaging glass—consists of silica based mix with alkaline earth oxide(s) in specific proportions", WPI/Thomson, RO 83460 A ; Mar. 30, 1984 (Abstract).
International Search Report & Written Opinion relating to PCT/US2013/048589 filed Jun. 28, 2013; dated Oct. 28, 2013.
Final Office Action dated Jan. 28, 2014 relating to U.S. Appl. No. 13/780,740, filed Feb. 28, 2013. pp. 1-37.
International Search Report & Written Opinion dated Jan. 16, 2014 for International Patent Application No. PCT/US2013/066370 filed Oct. 23, 2013. pp. 1-12.
Pantano, Carlo G.,"The Role of Coatings and Other Surface Treatments in the Strength of Glass", [online], Department of Materials Science and Engineering Materials Research Institute, The Pennsylvania State University, University Park, PA. 2009. Retrieved from the Internet: <URL: http://www.gmic.org/Strength%20In%20Glass/Pantano%20Pac%20Rim.pdf>. pp. 1-55.
Non-Final Office Action dated Mar. 10, 2014 relating to U.S. Appl. No. 14/052,048, filed Oct. 11, 2013. pp. 1-11.
ASTM, "Standard Specification for Glasses in Laboratory Apparatus," Designation E438-92 (Reapproved 2006). Retrieved from the Internet: <URL: http://enterprise2.astm.org/DOWNLOAD/E438-92R06.1656713-1.pdf>. p. 1.
International Search Report & Written Opinion dated Feb. 26, 2014 for International Patent Application No. PCT/US2013/071437 filed Nov. 22, 2013. pp. 1-12.
International Search Report & Written Opinion dated Feb. 26, 2014 for International Patent Application No. PCT/US2013/071447 filed Nov. 22, 2013. pp. 1-13.
International Search Report & Written Opinion dated Feb. 26, 2014 for International Patent Application No. PCT/US2013/071460 filed Nov. 22, 2013. pp. 1-12.
International Search Report & Written Opinion dated Feb. 26, 2014 for International Patent Application No. PCT/US2013/071473 filed Nov. 22, 2013. pp. 1-13.
Non-Final Office Action dated Mar. 20, 2014 relating to U.S. Appl. No. 14/057,697, filed Oct. 18, 2013. pp. 1-14.
Non-Final Office Action dated Aug. 13, 2014 relating to U.S. Appl. No. 13/780,740, filed Feb. 28, 2013. pp. 1-43.
Non-Final Office Action dated Sep. 9, 2014 relating to U.S. Appl. No. 14/057,697, filed Oct. 18, 2013. pp. 1-15.
U.S. Pharmacopeia Convention Medicines Compendium, "<660> Containers-Glass" [online], (2014). Retrieved from the Internet: <URL: https://mc.usp.org/general-chapters>. pp. 1-5.
Ciullo, P.A., Industrial Minerals and Their Uses—A Handbook and Formulary. William Andrew Publishing/Noyes, (1996). ISBN: 0-8155-1408-5. Online version available at: <URL: http://app.knovel.com/hotlink/toc/id:kpIMTUAHFB/industrial-minerals-their/industrial-minerals-their>. pp. 1-7.
Final Office Action dated Jul. 16, 2014 relating to U.S. Appl. No. 14/052,048, filed Oct. 11, 2013. pp. 1-9.
Plueddemann, Edwin, "Silane Coupling Agents," Springer Science+Business Media, LLC (1982). ISBN: 978-1-4899-0344-0. pp. 1-18.
Non-Final Office Action dated Nov. 14, 2014 relating to U.S. Appl. No. 14/075,605, filed Nov. 8, 2013. pp. 1-9.
Notice of Allowance dated Jan. 7, 2015 relating to U.S. Appl. No. 14/052,048, filed Oct. 11, 2013. pp. 1-10.
Non-Final Office Action dated Jan. 29, 2015 relating to U.S. Appl. No. 13/780,740, filed Feb. 28, 2013. pp. 1-79.
Hawley's Condensed Chemical Dictionary Melting Points, 2007. pp. 1-5.
Non-Final Office Action dated Mar. 4, 2015 relating to U.S. Appl. No. 14/057,697, filed Oct. 18, 2013. pp. 1-12.
Final Office Action dated May 6, 2015 relating to U.S. Appl. No. 13/780,740, filed Feb. 28, 2013. pp. 1-36.
English Machine Translation of CN 101831175 A (Sep. 15, 2010); pp. 1-13.

(56) References Cited

OTHER PUBLICATIONS

Pappalardo, L. T., "DSC Evaluation of Epoxy and Polyimide-Impregnated Laminates (Prepregs)"; Journal of Applied Polymer Science, vol. 21, 809-820, John Wiley & Sons, Inc. (1977).
Keramid and Kerimide 601, Scifinder American Chemical Society (ACS) (2015); pp. 1-5.
Russian 1st Office Action & Search Report and English Translation dated Oct. 27, 2017, for RU Patent Application No. 2015125913. pp. 1-13.
Japanese 1st Office Action dated Nov. 14, 2017, for JP Patent Application No. 2015-545129. pp. 1-8.
Non-Final Office Action dated May 30, 2017 for U.S. Appl. No. 14/075,620, filed Nov. 8, 2013. pp. 1-61.
Non-Final Office Action dated May 31, 2017 for U.S. Appl. No. 14/075,593, filed Nov. 8, 2013. pp. 1-51.
English Translation of Taiwan Official Communication dated Apr. 17, 2017 & Search Report dated Feb. 20, 2017, for TW Patent Application No. 102143473. pp. 1-3.
English Translation of Japanese Office Action dated May 30, 2017 for JP Patent Application No. 2015-520574. pp. 1-9.
Taiwan Search Report dated May 20, 2017 for TW Patent Application No. 102143475. pp. 1-2.
Non-Final Office Action dated Jul. 7, 2017 for U.S. Appl. No. 14/949,320, filed Nov. 23, 2015. pp. 1-15.
De Rosa, et al., "Scratch Resistant Polymide Coatings for Aluminosilicate Glass Surfaces", The Journal of Adhesion, 78: 113-127, Taylor & Francis (2002), ISSN: 0021-8464.
Hasegawa et al., "Photophysics, photochemistry, and optical properties of polyimides", Elsevier Science Ltd; Prog. Poly. Sci. 26 (2001), pp. 259-335.
Non-Final Office Action dated Apr. 18, 2017, for U.S. Appl. No. 15/374,338, filed Dec. 9, 2016. pp. 1-45.
Japanese 1st Office Action dated Sep. 26, 2017, for JP Patent Application No. 2015-545127. pp. 1-18.
Polyimide—Hawley's Condensed Chemical Dictionary—Wiley Online (2007); 1 Page.
Tyzor (Du Pont)—Hawley's Condensed Chemical Dictionary—Wiley Online (2007). 1 Page.
McKeen, L., "Fatigue and Tribological Properties of Plastics and Elastomers," 2d Ed 7 Polyimides, (2010); 25 Pages.
Final Office Action dated Jun. 3, 2015 relating to U.S. Appl. No. 14/075,605, filed Nov. 8, 2013. pp. 1-12.
Notice of Allowance dated Jun. 26, 2015 relating to U.S. Appl. No. 14/057,697, filed Oct. 18, 2013. pp. 1-9.
Non-Final Office Action dated Oct. 6, 2015 relating to U.S. Appl. No. 13/780,754, filed Feb. 28, 2013; pp. 1-24.
Non-Final Office Action dated Oct. 6, 2015 relating to U.S. Appl. No. 14/812,898, filed Jul. 29, 2015; pp. 1-22.
Notice of Allowance dated Dec. 9, 2015 for U.S. Appl. No. 13/780,740, filed Feb. 28, 2013. pp. 1-15.
Non-Final Office Action dated Dec. 16, 2015 for U.S. Appl. No. 14/812,902, filed Jul. 29, 2015. pp. 1-25.
Chao-Ching Chang et al., Synthesis and Optical Properties of Soluble Polyimide/Titania Hybrid Thin Films, Macromolecular Materials and Engineering, vol. 291, Issue 12, pp. 1521-1528, Dec. 8, 2006.
Yang-Yen Yu et al., High transparent polyimide/titania multi-layer anti-reflective hybrid films, Thin Solid Films 519 (2011) 4731-4736.
Qiu, et al., "Morphology and size control of inorganic particles in polyimide hybrids by using SiO2—TiO2 mixed oxide", Polymer 44 (2003) 5821-5826.
Non-Final Office Action dated Feb. 10, 2016 for U.S. Appl. No. 14/812,898, filed Jul. 29, 2015. pp. 1-11.
Non-Final Office Action dated Feb. 10, 2016 for U.S. Appl. No. 13/780,754, filed Feb. 28, 2013. pp. 1-11.
Non-Final Office Action dated Mar. 23, 2016 for U.S. Appl. No. 13/827,732, filed Mar. 14, 2013. pp. 1-28.
Singapore Written Opinion dated Feb. 23, 2016 for SG Patent Application No. 11201504070P. pp. 1-9.

Non-Final Office Action dated May 19, 2016 for U.S. Appl. No. 14/812,902, filed Jul. 29, 2015. pp. 1-15.
Flaim, et al., "High Refractive Index Polymer Coatings for Opto-electronics Applications," Society of Photo-Optical Instrumentation for Engineers (2003), SPIE Proceedings of Optical Systems Design 2003. pp. 1-12.
Chinese 2nd Office Action & Search Report dated May 19, 2016 for CN Patent Application No. 201380022462.7. pp. 1-11.
Singapore Written Opinion dated May 4, 2016 for SG Patent Application No. 11201503964W. pp. 1-10.
Karlsson, S. et al., The technology of chemical glass strengthening—a review. Glass Technology: European Journal of Glass Science and Technology A, Apr. 30, 2010, vol. 51, No. 2, pp. 41-54.
Singapore Written Opinion dated May 4, 2016 for SG Patent Application No. 11201504033T. pp. 1-9.
Liu, Y.H. et al., Tunable water-based lubrication behavior of alkyl- and fluoroalkyl-silanes, Chinese Science Bulletin, May 31, 2012, vol. 57, No. 15, pp. 1879-1885. doi: 10.1007/s11434-012-5106-2.
Cichomski, M. et al., Investigation of the structure of fluoroalkylsilanes deposited on alumina surface, Applied Surface Science, Jun. 18, 2012, vol. 258, No. 24, pp. 9849-9855.
Non-Final Office Action dated Jun. 15, 2016 for U.S. Appl. No. 13/780,754, filed Feb. 28, 2013. pp. 1-25.
Non-Final Office Action dated Jun. 15, 2016 for U.S. Appl. No. 14/812,898, filed Jul. 29, 2015. pp. 1-24.
Non-Final Office Action dated Jul. 13, 2016 for U.S. Appl. No. 13/780,740, filed Feb. 28, 2013. pp. 1-36.
Romero et al., Synthesis of aliphatic diamine and polytherimide with long perfluoroalkyl side chain, Journal of Fluorine Chemistry 117 (2002) 27-33.
Chemical Resistance of Plastics and Elastomers, 4th edition, 7 pages, William Andrew Publishing, Plastics Design Library, 13 Eaton Avenue, Norwich, NY (2008).
Gunston, Bill (2009). Cambridge Aerospace Dictionary (2nd edition)—visible light. Cambridge University Press. 1 page.
Scifinder CAS Registry No. 29158-17-6 ACS (2016), 1 page.
Scifinder CAS Acc No. 1987-619259 ACS (2016), 1 page.
Non-Final Office Action dated Sep. 27, 2016 for U.S. Appl. No. 14/812,902, filed Jul. 29, 2015. pp. 1-37.
Choi, et al., "Organic/Inorganic Imide Nanocomposites from Aminophenylsilsesquioxanes", American Chemical Society, (2003), Chem. Mater. 15, 3365-3375.
Wagner, Steven Robert, "High temperature-high humidity for polyimide coatings for aluminosilicate glass surfaces"; The Libraries at Alfred University; Scholes Library Catalog; (2001), pp. 1-81; OCLC: 671453753.
Non-Final Office Action dated Jan. 12, 2017, for U.S. Appl. No. 14/812,898, filed Jul. 29, 2015. pp. 1-44.
Non-Final Office Action dated Feb. 15, 2017, for U.S. Appl. No. 13/780,740, filed Feb. 28, 2013. pp. 1-39.
Canadian Official Action dated Mar. 6, 2017 for CA Patent Application No. 2,864,919. pp. 1-4.
Japanese 1st Office Action dated Feb. 21, 2017, for JP Patent Application No. 2014-558980; pp. 1-6.
Non-Final Office Action dated Apr. 6, 2017 for U.S. Appl. No. 14/812,902, filed Jul. 29, 2015.
Non-Final Office Action dated Jan. 24, 2017, for U.S. Appl. No. 15/331,113, filed Oct. 21, 2016. pp. 1-50.
Non-Final Office Action dated Mar. 29, 2017 for U.S. Appl. No. 13/780,754, filed Feb. 28, 2013. pp. 1-41.
European Pharmacopeia, 5th edition, 3.2 Containers, [online]. Retrieved from the Internet: <URL: http://pharmacyebooks.com/2009/09/european-pharmacopoeia-5-0-online.html>. 4 Pages, (2005).
English Machine Translation of detailed description of DE 102004011009 published Sep. 29, 2005; Machine Translation acquired on Jan. 8, 2016. pp. 1-11.
"Parylene Conformal Coating Specification and Properties", acquired from http://www.nbtc.cornell.edu/sites/default/files/Parylene%20Information%20Sheets.pdf on Dec. 20, 2016.
Japanese Final Office Action dated Jul. 24, 2018 for JP Patent Application No. 2015-545124. pp. 1-6.
Taiwan 1st Office Action & Search Report dated Jul. 30, 2018 for TW Patent Application No. 107102807. pp. 1-2.

(56) References Cited

OTHER PUBLICATIONS

English Translation of Japanese Decision on Rejection dated Nov. 14, 2018, for JP Patent Application No. 2015-545049. pp. 1-5.
English Translation of Japanese 1st Office Action dated Feb. 13, 2019 for JP Patent Application No. 2018-019178. pp. 1-5.
Non-Final Office Action dated May 30, 2019, for U.S. Appl. No. 15/337,695, filed Oct. 28, 2016. pp. 1-13.
English Translation of Japanese 1st Office Action dated Mar. 6, 2019 for JP Patent Application No. 2018-006413. pp. 1-11.
English Translation of Korean 2nd Office Action dated Sep. 10, 2019, for KR Patent Application No. 2019-7008449. pp. 1-2.
English Translation of Chinese 1st Office Action & Search Report dated Sep. 9, 2019, for CN Patent Application No. 201710851535.3. pp. 1-10.
English Translation of Russian Decision on Grant dated Oct. 4, 2019, for RU Patent Application No. 2018136739. pp. 1-22.
Final Office Action dated May 12, 2020, for U.S. Appl. No. 15/687,059. pp. 1-18.
Dean et al., "Pharmaceutical Packaging Technology", CRC Press. Nov. 2000. p. 149.
Non-Final Office Action dated Jun. 11, 2020, for U.S. Appl. No. 16/870,657, filed May 8, 2020. pp. 1-31.
"Lyophilization: Growing with Biotechnology", Genetic Engineering & Biotechnology News, Sep. 15, 2005, vol. 25, No. 16, acquired from https://www.genengnews.com/magazine/35/lyophilization-growing-with-biotechnology/ (Year: 2005). pp. 1-7.
Russian 1st Office Action and Search Report dated Feb. 11, 2020, for RU Patent Application No. 2018111021. pp. 1-15.
Final Office Action dated Mar. 12, 2021, for U.S. Appl. No. 15/337,695, filed Oct. 28, 2016. pp. 1-23.
Singapore Written Opinion and Search Report dated Jan. 20, 2021, for SG Patent Application No. 10201704148S. pp. 1-10.
Chinese 1st Office Action & Search Report dated Aug. 25, 2020, for CN Patent Application No. 201680057620.6. pp. 1-27.
Non-Final Office Action dated Sep. 1, 2020 for U.S. Appl. No. 15/337,695, filed Oct. 28, 2016. pp. 1-25.
Japanese 1st Office Action dated Jun. 30, 2021, for JP Patent Application No. 2020-82562. pp. 1-12.
Non-Final Office Action dated Jul. 15, 2021, for U.S. Appl. No. 16/355,797, filed Mar. 17, 2019. pp. 1-13.
Extended European Search Report dated Sep. 8, 2021, for EP Patent Application No. 21187669.3. pp. 1-11.
Shallenberger J. R. et al: Adsorption of polyamides and polyamide-silane mixtures at glass surfaces, Surface and Interface Analysis, vol. 35, No. 8, Aug. 1, 2003 (Aug. 1, 2003), pp. 667-672, XP055081787, ISSN: 0142-2421, DOI: 10.1002/sia.1589.
Wohl C. J. et al: Modification of the surface properties of polyimide films using polyhedral oligomeric silsesquioxane deposition and oxygen plasma exposure, Applied Surface Science, Elsevier, Amsterdam, NL, vol. 255, No. 18, Jun. 30, 2009 (Jun. 30, 2009), pp. 8135-8144, XP026221236, ISSN: 0169-4332, DOI: 10.1016/J.APSUSC.2009.05.030.

\* cited by examiner

HALOGENATED POLYIMIDE SILOXANE CHEMICAL COMPOSITIONS AND GLASS ARTICLES WITH HALOGENATED POLYIMIDE SILOXANE LOW-FRICTION COATINGS

CROSS REFERENCE TO RELATED APPLICATIONS

The present application claims priority to European Patent Application No. 15290254.0 filed Sep. 30, 2015 and entitled, "Halogenated Polyimide Siloxane Chemical Compositions and Glass Articles with Halogenated Polyimide Siloxane Low-Friction Coatings," the entirety of which is incorporated by reference herein.

BACKGROUND

Field

The present specification generally relates to coatings and, more specifically, to low-friction coatings applied to glass containers such as pharmaceutical packages.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' which have a proven history of chemical durability.

However, use of glass for such applications is limited by the mechanical performance of the glass. In the pharmaceutical industry, glass breakage is a safety concern for the end user, as the broken package and/or the contents of the package may injure the end user. Further, non-catastrophic breakage (i.e., when the glass cracks but does not break) may cause the contents to lose their sterility which, in turn, may result in costly product recalls.

Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package or causing the complete failure of the package.

One approach to improving the mechanical durability of the glass package is to thermally and/or chemically temper the glass package. Thermal tempering strengthens glass by inducing a surface compressive stress during rapid cooling after forming. This technique works well for glass articles with flat geometries (such as windows), glass articles with thicknesses greater than about 2 mm, and glass compositions with high thermal expansion. However, pharmaceutical glass packages typically have complex geometries (vial, tubular, ampoule, etc.), thin walls (sometimes between about 1-1.5 mm), and are produced from low expansion glasses, making glass pharmaceutical packages unsuitable for strengthening by thermal tempering. Chemical tempering also strengthens glass by the introduction of surface compressive stress. The stress is introduced by submerging the article in a molten salt bath. As ions from the glass are replaced by larger ions from the molten salt, a compressive stress is induced in the surface of the glass. The advantage of chemical tempering is that it can be used on complex geometries, thin samples, and is relatively insensitive to the thermal expansion characteristics of the glass substrate.

However, while the aforementioned tempering techniques improve the ability of the strengthened glass to withstand blunt impacts, these techniques are less effective in improving the resistance of the glass to abrasions, such as scratches, which may occur during manufacturing, shipping and handling.

Accordingly, a need exists for alternative glass articles which have improved resistance to mechanical damage.

SUMMARY

According to one embodiment, a coated glass article may comprise a glass container which may comprise a first surface and a second surface opposite the first surface, and a low-friction coating bonded to at least a portion of the first surface of the glass container. The low-friction coating may comprise a polyimide chemical composition. The polyimide chemical composition may be halogenated and the polyimide chemical composition may comprise a siloxane moiety.

In another embodiment, a polyimide chemical composition may be formed from the polymerization of a first monomer which may comprise an amine terminated siloxane, a second monomer which may comprise a halogenated aromatic dianhydride, and a third monomer which may comprise an aromatic halogenated diamine. The polyimide chemical composition may be soluble in a fully imidized form in an acetate, a ketone, or mixtures thereof.

In yet another embodiment, a glass article may be coated by a method comprising depositing a low-friction coating onto a first surface of the glass article. The low-friction coating may comprise a polyimide chemical composition, wherein the polyimide chemical composition is halogenated and wherein the polyimide chemical composition comprises a siloxane moiety.

Additional features and advantages of the polyimides that may be used for coating glass article, coated glass articles, and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
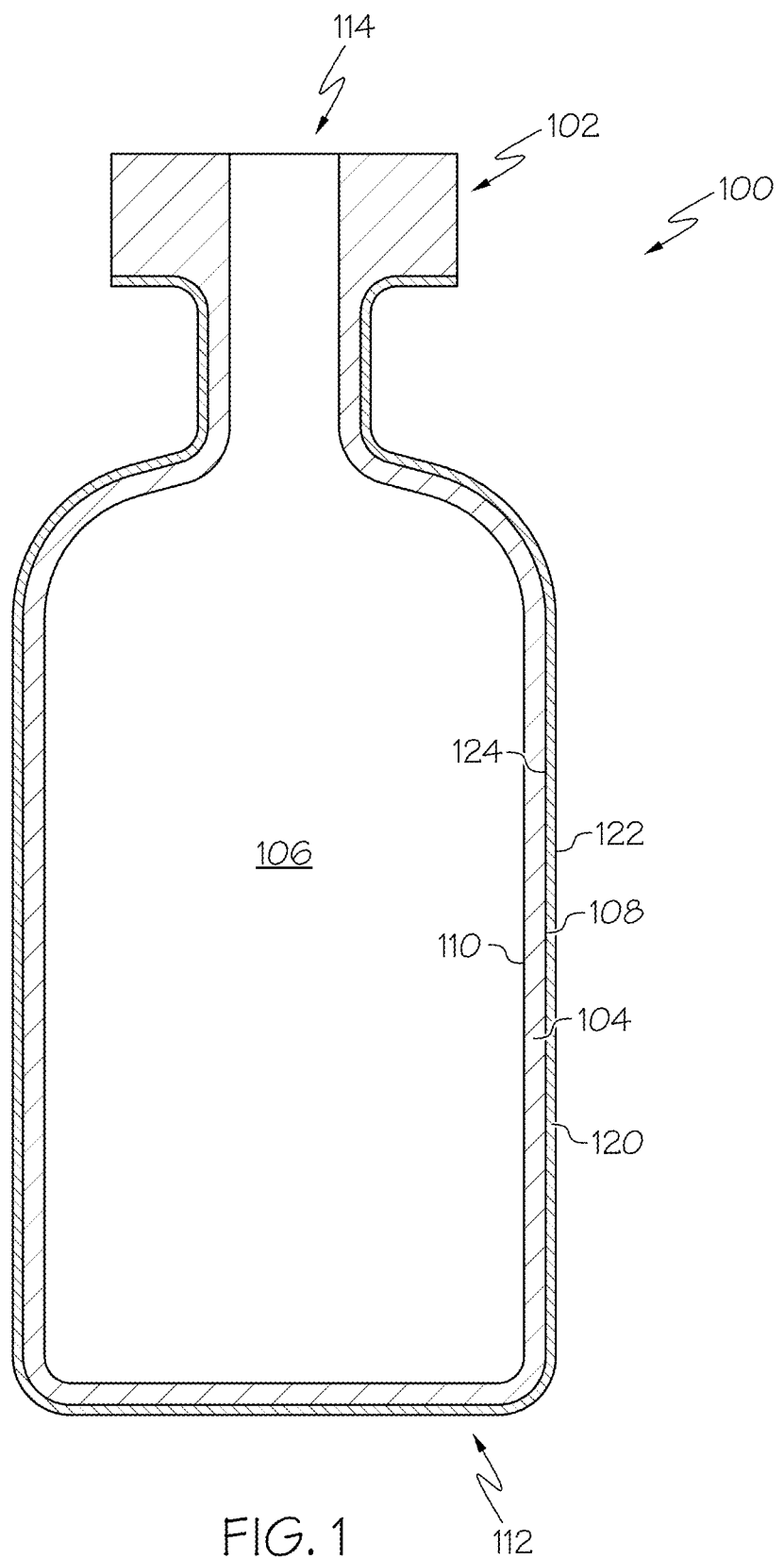
FIG. 1 schematically depicts a cross section of a glass container with a low-friction coating, according to one or more embodiments shown and described herein.

Reference will now be made in detail to various embodiments of polyimide compositions, low-friction coatings on glass articles, glass articles with low-friction coatings, and methods for producing the same, examples of which are schematically depicted in the figures. Such coated glass articles may be glass containers suitable for use in various packaging applications including, without limitation, as pharmaceutical packages. In embodiments, the low-friction coating are thermally stable when, after initial application, they are exposed to high temperatures such as those utilized during a depyrogenation process. For example, the coated glass articles described herein may sufficiently retain their low coefficient of friction following a thermal treatment and may not substantially yellow in color following such a thermal treatment. These pharmaceutical packages may or may not contain a pharmaceutical composition. In embodiments, the low-friction coatings may comprise polyimides which can be applied in fully imidized form (e.g., not as a polyamic acid) onto the glass articles. In embodiments, the polyimides described herein may be halogenated, such as fluorinated, and may comprise siloxane moieties. Such polyimides may be referred to as halogenated polyimide siloxanes throughout the present disclosure.

Various embodiments of the low-friction coatings, glass articles with low-friction coatings, and methods for forming the same will be described in further detail herein with specific reference to the appended drawings. While embodiments of the low-friction coatings described herein are applied to the outer surface of a glass container, it should be understood that the low-friction coatings described may be used as a coating on a wide variety of materials, including non-glass materials and on substrates other than containers including, without limitation, glass display panels and the like.

Generally, a low-friction coating may be applied to a surface of a glass article, such as a container that may be used as a pharmaceutical package. The low-friction coating may provide advantageous properties to the coated glass article such as a reduced coefficient of friction and increased damage resistance. The reduced coefficient of friction may impart improved strength and durability to the glass article by mitigating frictive damage to the glass. Further, the low-friction coating may maintain the aforementioned improved strength and durability characteristics following exposure to elevated temperatures and other conditions, such as those experienced during packaging and pre-packaging steps utilized in packaging pharmaceuticals, such as, for example, depyrogenation, autoclaving and the like. Accordingly, the low-friction coatings and glass articles with the low-friction coating may be thermally stable.

The low-friction coating may generally comprise a halogenated polyimide siloxane, such as a single layer of a halogenated polyimide siloxane. In another embodiment, a coupling agent, such as a urea-functionalized silane, may be included in the low-friction coating along with the halogenated polyimide siloxane. In some embodiments, the coupling agent may be disposed in a coupling agent layer positioned on the surface of the glass article and the halogenated polyimide siloxane may be disposed in a polymer layer positioned over the coupling agent layer. In other embodiments, the coupling agent and the halogenated polyimide siloxane composition may be mixed in a single layer.

FIG. 1 schematically depicts a cross section of a coated glass article, specifically a coated glass container 100. The coated glass container 100 comprises a glass body 102 and a low-friction coating 120. The glass body 102 has a glass container wall 104 extending between an exterior surface 108 (i.e., a first surface) and an interior surface 110 (i.e., a second surface). The interior surface 110 of the glass container wall 104 defines an interior volume 106 of the coated glass container 100. A low-friction coating 120 is positioned on at least a portion of the exterior surface 108 of the glass body 102. In some embodiments, the low-friction coating 120 may be positioned on substantially the entire exterior surface 108 of the glass body 102. The low-friction coating 120 has an outer surface 122 and a glass body contacting surface 124 at the interface of the glass body 102 and the low-friction coating 120. The low-friction coating 120 may be bonded to the glass body 102 at the exterior surface 108.

In one embodiment, the coated glass container 100 is a pharmaceutical package. For example, the glass body 102 may be in the shape of a vial, ampoule, ampul, bottle, flask, phial, beaker, bucket, carafe, vat, syringe body, or the like. The coated glass container 100 may be used for containing any composition, and in one embodiment, may be used for containing a pharmaceutical composition. A pharmaceutical composition may include any chemical substance intended for use in the medical diagnosis, cure, treatment, or prevention of disease. Examples of pharmaceutical compositions include, but are not limited to, medicines, drugs, medications, medicaments, remedies, and the like. The pharmaceutical composition may be in the form of a liquid, solid, gel, suspension, powder, or the like.

Figure 2:
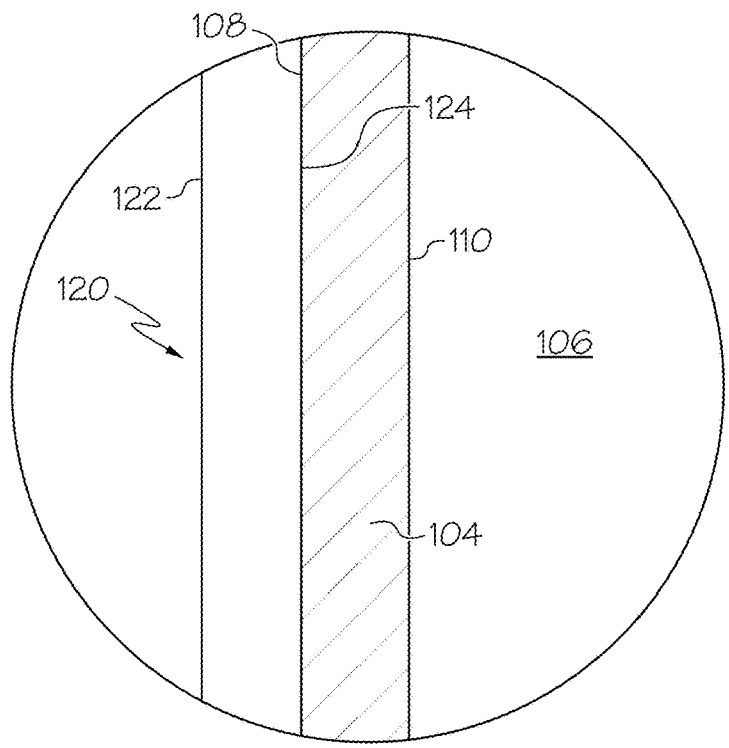
FIG. 2 schematically depicts a cross section of a glass container with a mono-layer low-friction coating, according to one or more embodiments shown and described herein.

Now referring to FIGS. 1 and 2, in one embodiment, the low-friction coating 120 comprises a single layered structure sometimes referred to herein as a mono-layer structure. For example, the low-friction coating 120 may have a substantially homogenous composition of a one or more polymers such as a halogenated polyimide siloxane. The low-friction coating 120 may comprise the halogenated polyimide siloxane in an amount of, for example, at least about 50 wt. %, at least about 60 wt. %, at least about 70 wt. %, at least about 80 wt. %, at least about 90 wt. %, at least about 95 wt. %, at least about 99 wt. %, or may consist essentially of the halogenated polyimide siloxane (e.g., at least about 99.5 wt. % of the low-friction coating 120 is a halogenated polyimide siloxane). In another embodiment, a halogenated polyimide siloxane chemical composition and a coupling agent may be substantially mixed in a single layer to form the low-friction coating 120. For example, the low-friction coating 120 may be a mixture of coupling agent and halogenated polyimide siloxane where the low-friction coating 120 comprises from, for example, 30 wt. % to 70 wt. % halogenated polyimide siloxane and 30 wt. % to 70 wt. % coupling agent.

Figure 3:
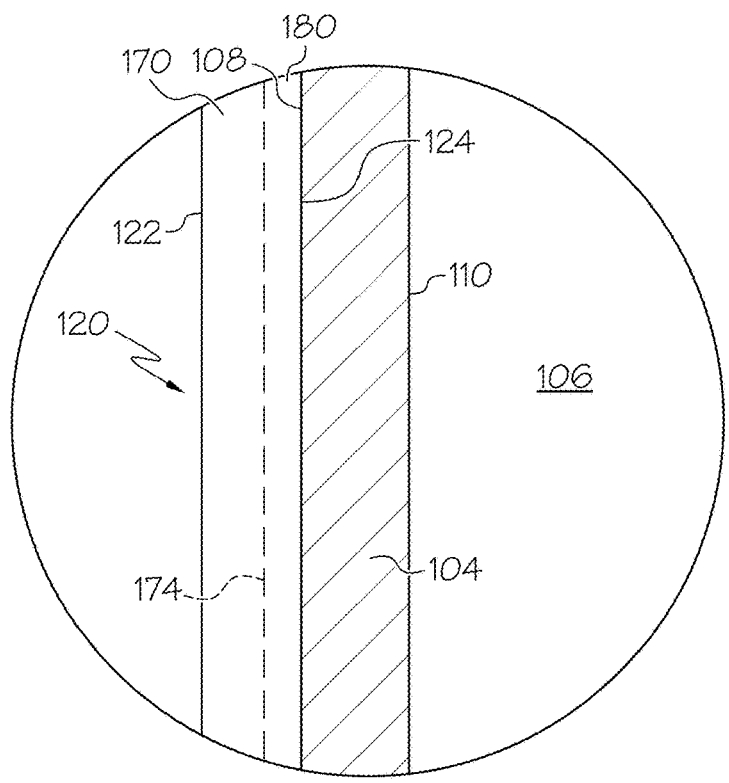
FIG. 3 schematically depicts a cross section of a glass container with a low-friction coating comprising a polymer layer and a coupling agent layer, according to one or more embodiments shown and described herein.

Now referring to FIGS. 1 and 3, in one embodiment, the low-friction coating 120 comprises a bi-layered structure. FIG. 3 shows a cross section of a coated glass container 100, where the low-friction coating comprises a polymer layer 170 and a coupling agent layer 180. A polymer chemical composition, such as a halogenated polyimide siloxane, may be contained in polymer layer 170 and a coupling agent may be contained in a coupling agent layer 180. The coupling agent layer 180 may be in direct contact with the exterior surface 108 of the glass container wall 104. The polymer layer 170 may be in direct contact with the coupling agent layer 180 and may form the outer surface 122 of the low-friction coating 120. In some embodiments the coupling agent layer 180 is bonded to the glass wall 104 and the polymer layer 170 is bonded to the coupling agent layer 180 at an interface 174. The polymer layer 170 may comprise the halogenated polyimide siloxane in an amount of, for example, at least about 50 wt. %, at least about 60 wt. %, at least about 70 wt. %, at least about 80 wt. %, at least about 90 wt. %, at least about 95 wt. %, at least about 99 wt. %, or may consist essentially of the halogenated polyimide siloxane (e.g., at least about 99.5 wt. % of the polymer layer 170 is a halogenated polyimide siloxane). The coupling agent layer 180 may comprise one or more coupling agents in an amount of, for example, at least about 50 wt. %, at least about 60 wt. %, at least about 70 wt. %, at least about 80 wt. %, at least about 90 wt. %, at least about 95 wt. %, at least about 99 wt. %, or may consist essentially of the one or more coupling agents (e.g., at least about 99.5 wt. % of the coupling agent layer 180 is a coupling agent).

In some other embodiments, the polymer layer may be positioned over the coupling agent layer, meaning that the polymer layer 170 is in an outer layer relative to the coupling agent layer 180, and the glass wall 104. As used herein, a first layer positioned "over" a second layer means that the first layer could be in direct contact with the second layer or separated from the second layer, such as with a third layer disposed between the first and second layers.

The low-friction coating 120 applied to the glass body 102 may have a thickness of less than or equal to about 100 μm, less than or equal to about 10 μm, less than or equal to about 8 μm, less than or equal to about 6 μm, less than or equal to about 4 μm, less than or equal to about 3 μm, less than or equal to about 2 μm, or even less than or equal to about 1 μm. In some embodiments, the thickness of the low-friction coating 120 may be less than or equal to about 800 nm, less than or equal to about 600 nm, less than or equal to about 400 nm 300 nm, less than or equal to about 200 nm, or even less than or equal to about 100 nm thick. In other embodiments, the low-friction coating 120 may be less than about 90 nm thick, less than about 80 nm thick, less than about 70 nm thick, less than about 60 nm thick, less than about 50 nm, or even less than about 25 nm thick. In some embodiments, the low-friction coating 120 may not be of uniform thickness over the entirety of the glass body 102. For example, the coated glass container 100 may have a thicker low-friction coating 120 in some areas, due to the process of contacting the glass body 102 with one or more coating solutions that form the low-friction coating 120. In some embodiments, the low-friction coating 120 may have a non-uniform thickness. For example, the coating thickness may be varied over different regions of a coated glass container 100, which may promote protection in a selected region.

In embodiments which include at least two layers, such as the polymer layer 170, and coupling agent layer 180, each layer may have a thickness of less than about 100 μm, less than or equal to about 10 μm, less than or equal to about 8 μm, less than or equal to about 6 μm, less than or equal to about 4 μm, less than or equal to about 3 μm, less than or equal to about 2 μm, or even less than or equal to about 1 μm. In some embodiments, the thickness of each layer may be less than or equal to about 0.5 μm, or even less than or equal to about 100 nm. In other embodiments, each layer may be less than about 90 nm thick, less than about 80 nm thick, less than about 70 nm thick, less than about 60 nm thick, less than about 50 nm, or even less than about 25 nm thick.

As noted herein, the low-friction coating 120 includes a polymer halogenated polyimide siloxane chemical composition. The halogenated polyimide siloxane may be formed from thermally stable halogenated polyimide siloxanes, such as halogenated polyimide siloxanes that do not substantially degrade at temperatures in the range of from 200° C. to 400° C., including 250° C., 300° C., and 350° C. These halogenated polyimide siloxanes may be applied with or without a coupling agent. As used herein, "halogenated polyimide siloxanes" refer to polyimides which are halogenated and comprise a siloxane moiety. A "siloxane moiety" refers to a Si—O—Si bonded chemical group. One or more monomers of the halogenated polyimide siloxane may comprise such a siloxane moiety. A "halogenated" compound is a compound which includes one or more halogen molecules such as, but not limited to, fluorine, chlorine, bromine, and/or iodine, where the halogen may sometimes replace a hydrogen molecule in a hydrocarbon.

The halogenated polyimide siloxanes may be formed from, for example, the reaction of one or more diamine monomer compositions with one or more dianhydride monomer compositions. Many polyimides are not stable in solution in a polyimide form, and are present in solution as polyamic acids, which are non-cylized polyimide precursors which are formed from diamine monomers and dianhydride monomers. However, the halogenated polyimide siloxanes of the present disclosure may be stable as fully imidized polyimide chemical species. In embodiments, the halogenated polyimide siloxanes may be deposited onto the glass articles in a fully imidized state and may not require a curing step to imidize, such as may be necessary for a polyamic acid that is deposited onto the glass article. In embodiments, the fully imidized halogenated polyimide siloxane may be cured, such as with a heat treatment about 300° C. for about 30 minutes or less. In some embodiments, a curing may occur following the deposition of a coupling agent layer and a polymer layer, or following the deposition of a mixed polymer and coupling agent layer. Without being bound by theory, it is believed that a curing step may promote adhesion of the halogenated polyimide siloxane to the glass body, in both embodiments where a coupling agent is utilized and where a coupling agent is not utilized.

Generally, polyamic acids must be cured to become imidized chemical species. Such curing may comprise heating the polyamic acid at 300° C. for about 30 minutes or less, or at a temperature higher than 300° C., such as at least 320° C., 340° C., 360° C., 380° C., or 400° C. for a shorter time. It is believed, without being bound by theory, that the curing step imidizes a polyamic acid by reaction of carboxylic acid moieties and amide moieties to form a polyimide.

As noted above, many conventional polyimides are not soluble in an imidized form, and may only be dissolved in a solution in a polyamic acid form. Furthermore, if a convention fully imidized polyimide can be dissolved in a solvent, such solvents may be toxic or high boiling point solvents. It is difficult, and may be dangerous, to handle such toxic or high boiling point solvents in a manufacturing setting with large volumes of the toxic or high boiling point solvents present during large scale manufacturing of glass articles, such as coated glass containers. Examples of toxic or high boiling point solvents include N,N-Dimethylacetamide (DMAc), N,N-Dimethylformamide (DMF), and 1-Methyl-2-pyrrolidinone (NMP) solvents, or mixtures thereof.

The halogenated polyimide siloxanes described herein may be soluble in a fully imidized form in a non-toxic and low boiling point solvent. Such non-toxic and low boiling point solvents may include acetates or ketones, such as, but not limited to, ethyl acetate, propyleneglycol methyl ether acetate, toluene, acetone, 2-butanone, and mixtures thereof. Without being bound by theory, it is believed that the improved solubility and compatibility with solvents such as acetates and ketones may be due to the combination of at least one amine terminated siloxane unit, at least one fluorinated aromatic dianhydride, and at east one aromatic fluorinated diamine in the polymer.

In embodiments, the halogenated polyimide siloxane may be a copolymer comprising one or more of a first monomer comprising an amine terminated siloxane, a second monomer comprising a halogenated anhydride (such as a halogenated dianhydride), and a third monomer comprising a halogenated amine (such as a halogenated diamine). The halogenated polyimide siloxane may additionally comprise other monomers. In embodiments, the second monomer, the third monomer, or both, may be fluorinated. In embodiments, the second monomer may comprise a fluorinated aromatic dianhydride, and/or the third monomer may comprise an aromatic fluorinated diamine. As used herein, a monomer that is referred to as an "amine" may comprise 1, 2, 3, or even more amine moieties. Also, as used herein, an "anhydride" monomer may comprise 1, 2, 3, or even more anhydride moieties. For example, while polyimides may generally be formed from dianhydrides and diamines, the dianhydrides and diamines may comprise additional anhydride or amine moieties, respectively.

In one embodiment the first monomer comprising an amine terminated siloxane may be 1,3-Bis(3-aminopropyl)-1,1,3,3-tetramethyl disiloxane, which is structurally depicted in Chemical Structure #1, below. 1,3-Bis(3-aminopropyl)-1,1,3,3-tetramethyl disiloxane may be referred to herein in an abbreviated form as "BADS".

Chemical Structure #1

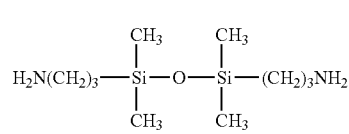

In one embodiment, the second monomer comprising a halogenated dianhydride may be 4,4'-(Hexafluoroisopropylidene) diphthalic anhydride, which is structurally depicted in Chemical Structure #2, below. 4,4'-(Hexafluoroisopropylidene) diphthalic anhydride may be referred to herein in an abbreviated form as "6FDA".

Chemical Structure #2

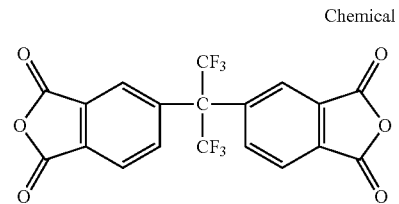

In one embodiment, the third monomer comprising a halogenated diamine may be 2,2-Bis(4-aminophenyl) hexafluoropropane, which is structurally depicted in Chemical Structure #3, below. 2,2-Bis(4-aminophenyl) hexafluoropropane may be referred to herein in an abbreviated form as "6F".

Chemical Structure #3

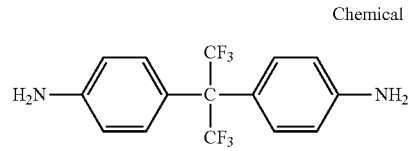

In one embodiment, the halogenated polyimide siloxane may consist of the first monomer comprising an amine terminated siloxane, the second monomer comprising a halogenated dianhydride, and the third monomer comprising a halogenated diamine. For example, the halogenated polyimide siloxane may consist of the three monomers listed in Chemical Structure #1, Chemical Structure #2, and Chemical Structure #3. Such a halogenated polyimide siloxane formed from Chemical Structure #1, Chemical Structure #2, and Chemical Structure #3 has the structure shown in Chemical Structure #4, below. Such a halogenated polyimide siloxane formed from Chemical Structure #1, Chemical Structure #2, and Chemical Structure #3 may be referred to herein in an abbreviated form as "Silimide-6F".

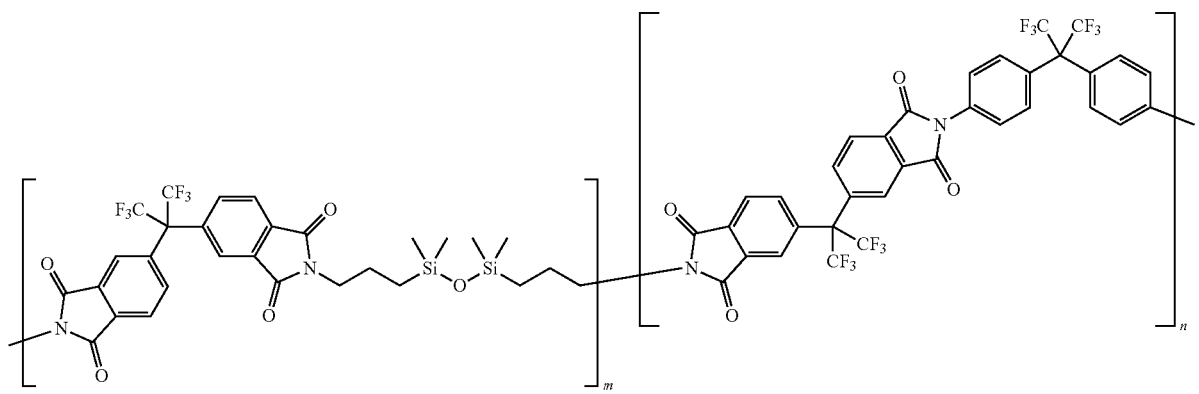

Chemical Structure #4

In Chemical Structure #4, 6FDA monomers are polymerized with 6F and BADS monomers, where the sum of the 6F and BADS monomers is about equal to the amount of 6FDA monomers present in the halogenated polyimide siloxane. In Chemical Structure #4, the ratio of 6F monomers to BADS monomers is represented by the ratio of n to m. In embodiments, the ratio of 6F monomers to BADS monomers may be from about 9:1 to about 1:9, such as from about 8:2 to about 2:8, from about 7:3 to about 3:7, or from about 6:4 to about 4:6, such as about 1:1. In other embodiments, the ratio of 6F monomers to BADS monomers may be from about 9:1 to about 6:1, or from about 8:1 to about 7:1, such as about 3:1. Additionally, it should be understood that the above recited ratios of 6F to BADS may apply generally as ratios for any amine terminated siloxane monomers to halogenated diamine monomers that are utilized to form halogenated polyimide siloxanes.

Without being bound by theory, it is believed that when the ratio of halogenated diamine monomers to amine terminated siloxane monomers is high, such as greater than about 9:1, then the resistance to discoloration (especially yellowing) at high temperature is acceptable, the glass transition temperature of the halogenated polyimide siloxane is high, but the adhesion of the coating may be degraded. When the ratio is low, such as less than about 1:9, the halogenated polyimide siloxane may exhibit good adhesion on glass but may thermally degrade at lower temperatures, have a lower glass transition temperature, and may have visible discoloration (yellowing) when cured or exposed to thermal treatments such as depyrogenation.

The halogenated polyimide siloxanes described herein may have a glass transition temperature of from about 50° C. to about 300° C. For example, a polyimide formed from 6FDA and 6F in a 1:1 molar ratio may have a glass transition temperature of about 300° C., and a polyimide formed from 6FDA and BADS in a 1:1 molar ratio may have a glass transition temperature of about 50° C. Without being bound by theory, it is believed that a polyimide formed from 6FDA. BADS, and 6F will have a glass transition temperature that is between about 50° C. and about 300° C., where the glass transition temperature is a function of the ratio of BADS to 6F.

In additional to the amine terminated siloxane, halogenated diamine, and halogenated dianhydride, other monomers may be present in the halogenated polyimide siloxane. For example, monomers that are not amine terminated siloxanes, halogenated diamine, or halogenated dianhydrides may make up as much as 5% of monomers, 10% of monomers, 20% of monomers, or even at least about 30% of monomers of the halogenated polyimide siloxane. Such additional monomers may be incorporated for enhanced solubility in solvents.

While additional monomers may be incorporated into the halogenated polyimide siloxane, the halogenated polyimide siloxane may comprise halogenated dianhydride monomers in an amount of at least about 20% of the total monomers, at least about 30% of the total monomers, at least about 40% of the total monomers, at least about 45% of the total monomers, or even 50% the total of monomers. The halogenated polyimide siloxane may comprise halogenated diamine monomers in an amount of at least about 10% of the total monomers, at least about 15% of the total monomers, at least about 20% of the total monomers, at least about 23% of the total monomers, or even 25% the total of monomers. The halogenated polyimide siloxane may comprise amine terminated siloxane monomers in an amount of at least about 10% of the total monomers, at least about 15% of the total monomers, at least about 20% of the total monomers, at least about 23% of the total monomers, or even 25% the total of monomers. As used herein, the percentages of a specific monomer in a polyimide refers to a molar ratio of the number of monomer units of a particular monomer divided by the total number of monomers in the polyimide chain.

In some embodiments, the halogenated polyimide siloxane may include a monomer which includes the joined double benzene moiety depicted in Chemical Structure #5. In Chemical Structure #5, "A" may represent —C(CH$_3$)$_2$—, —SO$_2$—, —S—, or —O—, and "a" represents 0 or 1 (0 meaning the benzenes are directly connected without an "A" group).

Chemical Structure #5

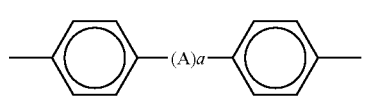

In embodiments, the halogenated polyimide siloxane may be a random copolymer. The halogenated polyimide siloxanes described herein may have a number average molar mass ($M_n$) of about 19 Da, such as from about 18 Da to about 20 Da, from about 17 Da to about 21 Da, from about 16 Da to about 22 Da, or from about 15 Da to about 23 Da. For example, the Silimide-6F polyimide of Chemical Structure #4 may have a $M_n$ equal to about 19 Da when m:n is about 3:1 (referred to herein as "Silimide-6F 25/75"). The halogenated polyimide siloxanes described herein may have a weight average molar mass ($M_w$) of about 40 Da, such as from about 39 Da to about 41 Da, from about 38 Da to about 42 Da, from about 36 Da to about 44 Da, or from about 30 Da to about 50 Da. For example, the Silimide-6F polyimide of Chemical Structure #4 may have a $M_w$ equal to about 19 Da when m:n is about 3:1. The halogenated polyimide siloxanes described herein may have a polydispersity index of about 2.15, such as from about 2.0 to about 2.3, from about 1.8 to about 2.5, or from about 1.5 to about 2.8. For example, the Silimide-6F polyimide of Chemical Structure #4 may have a polydispersity index of about 2.15 when m:n is about 3:1.

As noted herein, in some embodiments, the low-friction coating 120 comprises a coupling agent. The coupling agent may improve the adherence or bonding of the halogenated polyimide siloxanes to the glass body 102, and is generally disposed between the glass body 102 and the halogenated polyimide siloxanes or mixed with the halogenated polyimide siloxanes. Adhesion, as used herein, refers to the strength of adherence or bonding of the low friction coating prior to and following a treatment applied to the coated glass container, such as a thermal treatment. Thermal treatments include, without limitation, autoclaving, depyrogenation, lyophilization, or the like. It should be understood that the curing processes described herein are separate from the heating treatments described herein, such as those heating treatments similar or identical to processes in the pharmaceutical packaging industry, such as depyrogenation or the heating treatments used to define thermal stability, as described herein.

In one embodiment, the coupling agent may comprise at least one silane chemical composition. As used herein, a "silane" chemical composition is any chemical composition comprising a silane moiety, including functional organosilanes, as well as silanols formed from silanes in aqueous solutions. The silane chemical compositions of the coupling agent may be aromatic or aliphatic. In some embodiments, the at least one silane chemical composition may comprise an amine moiety, such as a primary amine moiety or a secondary amine moiety. Furthermore, the coupling agent may comprise hydrolysates and/or oligomers of such silanes, such as one or more silsesquioxane chemical compositions that are formed from the one or more silane chemical compositions. The silsesquioxane chemical compositions may comprise a full cage structure, partial cage structure, or no cage structure.

The coupling agent may comprise any number of different chemical compositions, such as one chemical composition, two different chemical compositions, or more than two different chemical compositions including oligomers formed from more than one monomeric chemical composition. In one embodiment, the coupling agent may comprise at least one of (1) a first silane chemical composition, hydrolysate thereof, or oligomer thereof, and (2) a chemical composition formed from the oligomerization of at least the first silane chemical composition and a second silane chemical composition. In another embodiment, the coupling agent comprises a first and second silane. As used herein, a "first" silane chemical composition and a "second" silane chemical composition are silanes having different chemical compositions. The first silane chemical composition may be an aromatic or an aliphatic chemical composition, may optionally comprise an amine moiety, and may optionally be an alkoxysilane. Similarly, the second silane chemical composition may be an aromatic or an aliphatic chemical composition, may optionally comprise an amine moiety, and may optionally be an alkoxysilane.

For example, in one embodiment, only one silane chemical composition is applied as the coupling agent. In such an embodiment, the coupling agent may comprise a silane chemical composition, hydrolysate thereof, or oligomer thereof.

In another embodiment, multiple silane chemical compositions may be applied as the coupling agent. In such an embodiment, the coupling agent may comprise at least one of (1) a mixture of the first silane chemical composition and a second silane chemical composition, and (2) a chemical composition formed from the oligomerization of at least the first silane chemical composition and the second silane chemical composition.

Referring to the embodiments described above, the first silane chemical composition, second silane chemical composition, or both, may be aromatic chemical compositions. As used herein, an aromatic chemical composition contains one or more six-carbon rings characteristic of the benzene series and related organic moieties. The aromatic silane chemical composition may be an alkoxysilane such as, but not limited to, a dialkoxysilane chemical composition, hydrolysate thereof, or oligomer thereof, or a trialkoxysilane chemical composition, hydrolysate thereof, or oligomer thereof. In some embodiments, the aromatic silane may comprise an amine moiety, and may be an alkoxysilane comprising an amine moiety. In another embodiment, the aromatic silane chemical composition may be an aromatic alkoxysilane chemical composition, an aromatic acyloxysilane chemical composition, an aromatic halogen silane chemical composition, or an aromatic aminosilane chemical composition. In another embodiment, the aromatic silane chemical composition may be selected from the group consisting of aminophenyl, 3-(m-aminophenoxy) propyl, N-phenylaminopropyl, or (chloromethy) phenyl substituted alkoxy, acyloxy, halogen, or amino silanes. For example, the aromatic alkoxysilane may be, but is not limited to, aminophenyltrimethoxy silane (sometimes referred to herein as "APhTMS"), aminophenyldimethoxy silane, aminophenyltriethoxy silane, aminophenyldiethoxy silane, 3-(m-aminophenoxy) propyltrimethoxy silane, 3-(m-aminophenoxy) propyldimethoxy silane, 3-(m-aminophenoxy) propyltriethoxy silane, 3-(m-aminophenoxy) propyldiethoxy silane, N-phenylaminopropyltrimethoxysilane, N-phenylaminopropyldimethoxysilane, N-phenylaminopropyltriethoxysilane, N-phenylaminopropyldiethoxysilane, hydrolysates thereof, or oligomerized chemical composition thereof. In an exemplary embodiment, the aromatic silane chemical composition may be aminophenyltrimethoxy silane.

Referring again to the embodiments described above, the first silane chemical composition, second silane chemical composition, or both, may be aliphatic chemical compositions. As used herein, an aliphatic chemical composition is non-aromatic, such as a chemical composition having an open chain structure, such as, but not limited to, alkanes, alkenes, and alkynes. For example, in some embodiments, the coupling agent may comprise a chemical composition that is an alkoxysilane and may be an aliphatic alkoxysilane such as, but not limited to, a dialkoxysilane chemical composition, a hydrolysate thereof, or an oligomer thereof, or a trialkoxysilane chemical composition, a hydrolysate thereof, or an oligomer thereof. In some embodiments, the aliphatic silane may comprise an amine moiety, and may be an alkoxysilane comprising an amine moiety, such as an aminoalkyltrialkoxysilane. In one embodiment, an aliphatic silane chemical composition may be selected from the group consisting of 3-aminopropyl, N-(2-aminoethyl)-3-aminopropyl, vinyl, methyl, N-phenylaminopropyl, (N-phenylamino)methyl, N-(2-Vinylbenzylaminoethyl)-3-aminopropyl substituted alkoxy, acyloxy, halogen, or amino silanes, hydrolysates thereof, or oligomers thereof. Aminoalkyltrialkoxysilanes, include, but are not limited to, 3-aminopropyltrimethoxy silane (sometimes referred to herein as "GAPS"), 3-aminopropyldimethoxy silane, 3-aminopropyltriethoxy silane, 3-aminopropyldiethoxy silane, N-(2-aminoethyl)-3-aminopropyltrimethoxysilane, N-(2-aminoethyl)-3-aminopropyldimethoxysilane, N-(2-aminoethyl)-3-aminopropyltriethoxysilane, N-(2-aminoethyl)-3-aminopropyldiethoxysilane, hydrolysates thereof, and oligomerized chemical composition thereof. In other embodiments, the aliphatic alkoxysilane chemical composition may not contain an amine moiety, such as an alkyltrialkoxysilane or alkylbialkoxysilane. Such alkyltrialkoxysilanes or alkylbialkoxysilanes include, but are not limited to, vinyltrimethoxy silane, vinyldimethoxy silane, vinyltriethoxy silane, vinyldiethoxy silane, methyltrimethoxysilane, methyldimethoxysilane, methyltriethoxysilane, methyldiethoxysilane, hydrolysates thereof, or oligomerized chemical composition thereof. In an exemplary embodiment, the aliphatic silane chemical composition is 3-aminopropyltrimethoxy silane. Also contemplated herein as coupling agent compositions are amino bis silanes such as, but not limited to bis((3-triethoxysilyl)propyl)amine or bis((3-trimethoxysilyl)propyl)amine.

In one embodiment, the coupling agent may comprise a urea-functionalized silane and may be devoid of amino groups and aromatic groups. Without being bound by theory, it is believed that such urea-functionalized silane layers do not undergo any discoloration and thus prevent yellowing of the protective coating when exposed to thermal treatments such as depyrogenation. Additionally, urea-functionalized silane coupling agents may be less expensive than amino-functionalized silanes and aliphatic silanes may be less expensive than aromatic silanes. Thus, an aliphatic urea-functionalized silane may be desirable over some amino-functionalized aromatic silanes. Examples of urea-functionalized silanes include 1-[3-(Trimethoxysilyl)propyl]urea, 1-(3-(Triethoxysilyl)propyl)urea, Bis(ureido)silane, and ureas prepared from isocyanates or amino silanes.

In another embodiment, the coupling agent may comprise a chemical composition that is an aminoalkylsilsesquioxane. In one embodiment the coupling agent comprises aminopropylsilsesquioxane (APS) oligomer (commercially available as an aqueous solution from Gelest). In one embodiment, the aromatic silane chemical composition is a chlorosilane chemical composition. In another embodiment, the coupling agent may comprise chemical composition that are hydrolyzed analogs of aminoalkoxysilanes such as, but not limited to, (3-Aminopropyl)silantriol, N-(2-Aminoethyl)-3-aminopropyl-silantriol and/or mixtures thereof.

In another embodiment, the coupling agent may be an inorganic material, such as metal and/or a ceramic film. Non-limiting examples of suitable inorganic materials used as the coupling agent include titanates, zirconates, tin, titanium, and/or oxides thereof.

Referring again to FIGS. 1, 2 and 3, the low-friction coating 120 may be applied in a single deposition step (in cases where the low-friction coating 120 comprises a single layer as in FIG. 2) or may be applied in a multi-stage process, wherein the glass body 102 is contacted with the coupling agent solution to form the coupling agent layer 180 (as described above), and optionally dried, and then contacted with a polymer chemical composition solution, such as a halogenated polyimide siloxane in solution, such as by a submersion process, or alternatively, the polymer layer 170 may be applied by a spray or other suitable means, and optionally dried. A description of suitable deposition methods for the low-friction coating 120 described herein may be found in U.S. patent application Ser. No. 13/780,740 entitled "Glass Articles with Low-Friction Coatings," which is incorporated by reference in its entirety herein.

The glass articles, such as glass containers, to which the low-friction coating 120 may be applied may be formed from a variety of different glass compositions. The specific composition of the glass article may be selected according to the specific application such that the glass has a desired set of physical properties.

The glass containers may be formed from a glass composition which has a coefficient of thermal expansion in the range from about $25 \times 10^{-7}/°C$ to $80 \times 10^{-7}/°C$. For example, in some embodiments described herein, the glass body 102 is formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, $ZnO$, $TiO_2$, $As_2O_3$, or the like.

In some embodiments described herein, the glass body 102 is strengthened such as by ion-exchange strengthening, herein referred to as "ion-exchanged glass". For example, the glass body 102 may have a compressive stress of greater than or equal to about 300 MPa or even greater than or equal to about 350 MPa. In some embodiments, the compressive stress may be in a range from about 300 MPa to about 900 MPa. However, it should be understood that, in some embodiments, the compressive stress in the glass may be less than 300 MPa or greater than 900 MPa. In some embodiments, the glass body 102 may have a depth of layer greater than or equal to 20 µm. In some of these embodiments, the depth of layer may be greater than 50 µm or even greater than or equal to 75 µm. In still other embodiments, the depth of the layer may be up to or greater than 100 µm. The ion-exchange strengthening may be performed in a molten salt bath maintained at temperatures from about 350° C. to about 500° C. To achieve the desired compressive stress, the glass container (uncoated) may be immersed in the salt bath for less than about 30 hours or even less than about 20 hours. For example, in one embodiment the glass container is immersed in a 100% $KNO_3$ salt bath at 450° C. for about 8 hours.

In one particularly exemplary embodiment, the glass body 102 may be formed from an ion exchangeable glass composition described in pending U.S. patent application Ser. No. 13/660,894 filed Oct. 25, 2012 and entitled "Glass Compositions with Improved Chemical and Mechanical Durability" assigned to Corning, Incorporated.

However it should be understood that the coated glass containers 100 described herein may be formed from other glass compositions including, without limitation, ion-exchangeable glass compositions and non-ion exchangeable glass compositions. For example, in some embodiments the glass container may be formed from Type 1B glass compositions such as, for example, Schott Type 1B aluminosilicate glass.

In some embodiments described herein, the glass article may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but not limited to Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20\text{-}85 \times 10^{-7\circ}$ $C.^{-1}$.

When the coated glass articles described herein are glass containers, the glass body 102 of the coated glass containers 100 may take on a variety of different forms. For example, the glass bodies described herein may be used to form coated glass containers 100 such as vials, ampoules, cartridges, syringe bodies and/or any other glass container for storing pharmaceutical compositions. Moreover, the ability to chemically strengthen the glass containers prior to coating can be utilized to further improve the mechanical durability of the glass containers. Accordingly, it should be understood that, in at least one embodiment, the glass containers may be ion exchange strengthened prior to application of the low-friction coating. Alternatively, other strengthening methods such as heat tempering, flame polishing, and laminating, as described in U.S. Pat. No. 7,201,965, could be used to strengthen the glass before coating.

Various properties of the coated glass containers (i.e., coefficient of friction, horizontal compression strength, 4-point bend strength) may be measured when the coated glass containers are in an as-coated condition (i.e., following application of the coating without any additional treatments other than curing if applicable) or following one or more processing treatments, such as those similar or identical to treatments performed on a pharmaceutical filling line, including, without limitation, washing, lyophilization, depyrogenation, autoclaving, or the like.

Depyrogenation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The coated glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to dehydrogenate a coated glass container, such as the coated glass containers described herein. For example, as described herein, the coated glass containers may be exposed to temperatures of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

As used herein, lyophilization conditions (i.e., freeze drying) refer to a process in which a sample is filled with a liquid that contains protein and then frozen at −100° C., followed by water sublimation for 20 hours at −15° C. under vacuum.

As used herein, autoclave conditions refer to steam purging a sample for 10 minutes at 100° C., followed by a 20 minute dwelling period wherein the sample is exposed to a 121° C. environment, followed by 30 minutes of heat treatment at 121° C.

The coefficient of friction ($\mu$) of the portion of the coated glass container with the low-friction coating may have a lower coefficient of friction than a surface of an uncoated glass container formed from a same glass composition. A coefficient of friction ($\mu$) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for coated glass container 100 is reported as the coefficient of friction between the outer surface of a first glass container (having an outer diameter of between about 16.00 mm and about 17.00 mm) and the outer surface of second glass container which is identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N.

Figure 4:
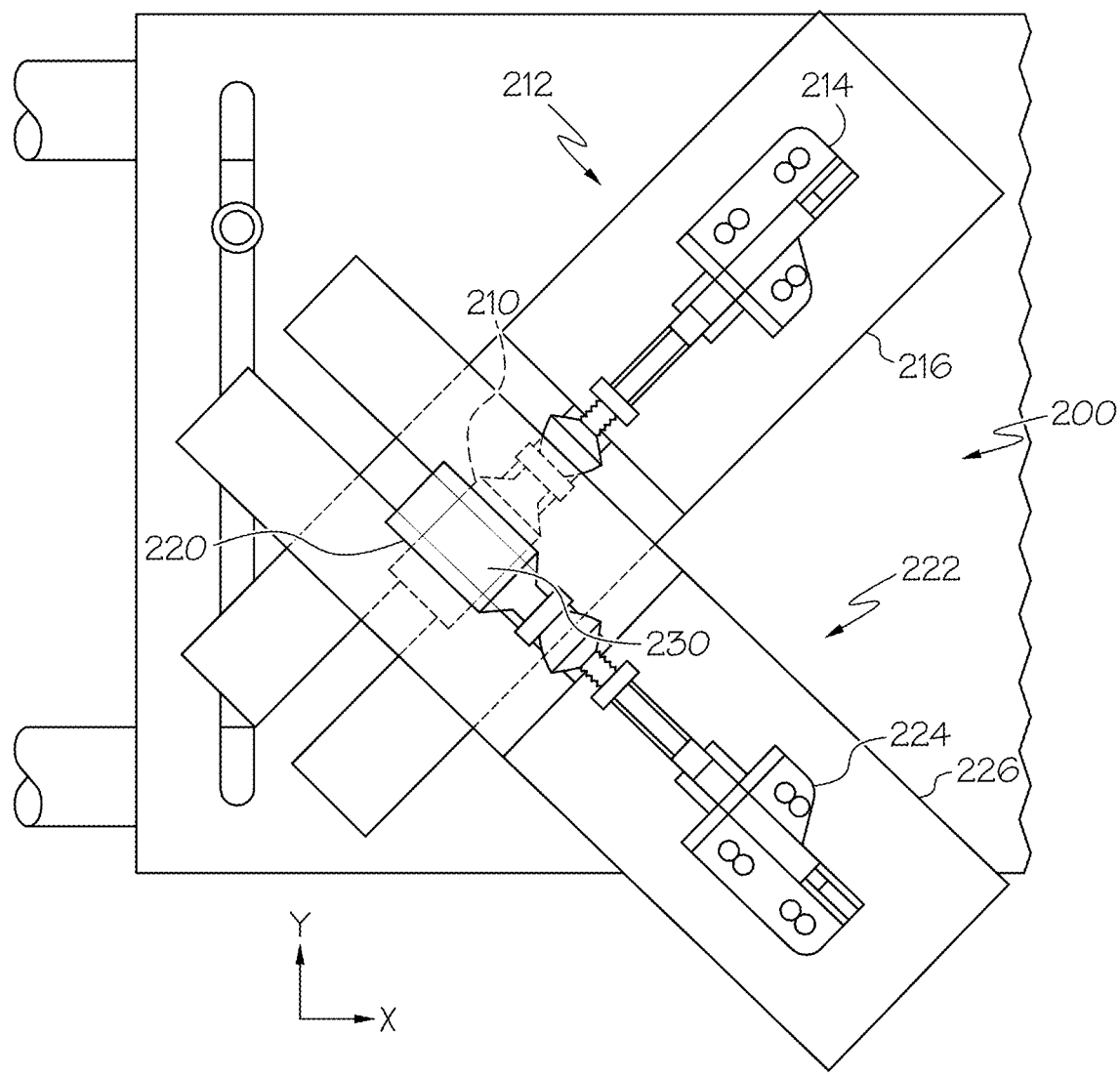
FIG. 4 schematically depicts a testing jig for determining the coefficient of friction between two surfaces, according to one or more embodiments shown and described herein.

In the embodiments described herein, the coefficient of friction of the glass containers (both coated and uncoated) is measured with a vial-on-vial testing jig. The testing jig 200 is schematically depicted in FIG. 4. The same apparatus may also be used to measure the frictive force between two glass containers positioned in the jig. The vial-on-vial testing jig 200 comprises a first clamp 212 and a second clamp 222 arranged in a cross configuration. The first clamp 212 comprises a first securing arm 214 attached to a first base 216. The first securing arm 214 attaches to the first glass container 210 and holds the first glass container 210 stationary relative to the first clamp 212. Similarly, the second clamp 222 comprises a second securing arm 224 attached to a second base 226. The second securing arm 224 attaches to the second glass container 220 and holds it stationary relative to the second clamp 222. The first glass container 210 is positioned on the first clamp 212 and the second glass container 220 is positioned of the second clamp 222 such that the long axis of the first glass container 210 and the long axis of the second glass container 220 are positioned at about a 90° angle relative to one another and on a horizontal plane defined by the x-y axis.

A first glass container 210 is positioned in contact with the second glass container 220 at a contact point 230. A normal force is applied in a direction orthogonal to the horizontal plane defined by the x-y axis. The normal force may be applied by a static weight or other force applied to the second clamp 222 upon a stationary first clamp 212. For example, a weight may be positioned on the second base 226 and the first base 216 may be placed on a stable surface, thus inducing a measurable force between the first glass container 210 and the second glass container 220 at the contact point 230. Alternatively, the force may be applied with a mechanical apparatus, such as a UMT (universal mechanical tester) machine.

The first clamp 212 or second clamp 222 may be moved relative to the other in a direction which is at a 45° angle with the long axis of the first glass container 210 and the second glass container 220. For example, the first clamp 212 may be held stationary and the second clamp 222 may be moved such that the second glass container 220 moves across the first glass container 210 in the direction of the x-axis. A similar setup is described by R. L. De Rosa et al., in "Scratch Resistant Polyimide Coatings for Alumino Silicate Glass surfaces" in The Journal of Adhesion, 78: 113-127, 2002. To measure the coefficient of friction, the force required to move the second clamp 222 and the normal force applied to first and second glass containers 210, 220 are measured with load cells and the coefficient of friction is calculated as the quotient of the frictive force and the normal force. The jig is operated in an environment of 25° C. and 50% relative humidity.

In the embodiments described herein, the portion of the coated glass container with the low-friction coating has a coefficient of friction of less than or equal to about 0.7 relative to a like-coated glass container, as determined with the vial-on-vial jig described above. In other embodiments, the coefficient of friction may be less than or equal to about 0.6, or even less than or equal to about 0.5. In some embodiments, the portion of the coated glass container with the low-friction coating has a coefficient of friction of less than or equal to about 0.4 or even less than or equal to about 0.3. Coated glass containers with coefficients of friction less than or equal to about 0.7 generally exhibit improved resistance to frictive damage and, as a result, have improved mechanical properties. For example, conventional glass containers (without a low-friction coating) may have a coefficient of friction of greater than 0.7.

In some embodiments described herein, the coefficient of friction of the portion of the coated glass container with the low-friction coating is at least 20% less than a coefficient of friction of a surface of an uncoated glass container formed from a same glass composition. For example, the coefficient of friction of the portion of the coated glass container with the low-friction coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the low-friction coating may have a coefficient of friction of less than or equal to about 0.7 after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the low-friction coating may not increase by more than about 30% after exposure to a temperature of about 260° C. for 30 minutes. In other embodiments, coefficient of friction of the portion of the coated glass container with the low-friction coating may not increase by more than about 30% (i.e., about 25%, about 20%, about 15%, or even about 10%) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the coated glass container with the low-friction coating may not increase by more than about 0.5 (i.e., about 0.45, about 0.04, about 0.35, about 0.3, about 0.25, about 0.2, about 0.15, about 0.1, or even about 0.05) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the low-friction coating may not increase at all after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the low-friction coating may have a coefficient of friction of less than or equal to about 0.7 after being submerged in a water bath at a temperature of about 70° C. for 10 minutes. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the low-friction coating may not increase by more than about 30% after being submerged in a water bath at a temperature of about 70° C. for 10 minutes. In other embodiments, coefficient of friction of the portion of the coated glass container with the low-friction coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the low-friction coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the coated glass container with the low-friction coating may have a coefficient of friction of less than or equal to about 0.7 after exposure to lyophilization conditions. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the low-friction coating may not increase by more than about 30% after exposure to lyophilization conditions. In other embodiments, coefficient of friction of the portion of the coated glass container with the low-friction coating may not increase by more than about 30% (i.e., about 25%, about 20%, about 15%, or event about 10%) after exposure to lyophilization conditions. In some embodiments, the coefficient of friction of the portion of the coated glass container with the low-friction coating may not increase at all after exposure to lyophilization conditions.

In some embodiments, the portion of the coated glass container with the low-friction coating may have a coefficient of friction of less than or equal to about 0.7 after exposure to autoclave conditions. In other embodiments, the portion of the coated glass container with the low-friction coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the low-friction coating may not increase by more than about 30% after exposure to autoclave conditions. In other embodiments, coefficient of friction of the portion of the coated glass container with the low-friction coating may not increase by more than about 30% (i.e., about 25%, about 20%, about 15%, or event about 10%) after exposure to autoclave conditions. In some embodiments, the coefficient of friction of the portion of the coated glass container with the low-friction coating may not increase at all after exposure to autoclave conditions.

The coated glass containers described herein have a horizontal compression strength. Referring to FIG. 1, the horizontal compression strength, as described herein, is measured by positioning the coated glass container 100 horizontally between two parallel platens which are oriented in parallel to the long axis of the glass container. A mechanical load is then applied to the coated glass container 100 with the platens in the direction perpendicular to the long axis of the glass container. The load rate for vial compression is 0.5 in/min, meaning that the platens move towards each other at a rate of 0.5 in/min. The horizontal compression strength is measured at 25° C. and 50% relative humidity. A measurement of the horizontal compression strength can be given as a failure probability at a selected normal compression load. As used herein, failure occurs when the glass container ruptures under a horizontal compression in least 50% of samples. In some embodiments, a coated glass container may have a horizontal compression strength at least 10%, 20%, or 30% greater than an uncoated vial.

Referring now to FIGS. 1 and 4, the horizontal compression strength measurement may also be performed on an abraded glass container. Specifically, operation of the testing jig 200 may create damage on the coated glass container outer surface 122, such as a surface scratch or abrasion that weakens the strength of the coated glass container 100. The glass container is then subjected to the horizontal compression procedure described above, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N.

The coated glass containers can be evaluated for horizontal compression strength following a heat treatment. The heat treatment may be exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded, as described above. In one embodiment, the horizontal compression strength of the coated glass container is not reduced by more than about 20% after being exposed to a heat treatment of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

The coated glass articles described herein may be thermally stable after heating to a temperature of at least 260° C. for a time period of 30 minutes. The phrase "thermally stable," as used herein, means that the low friction coating applied to the glass article remains substantially intact on the surface of the glass article after exposure to the elevated temperatures such that, after exposure, the mechanical properties of the coated glass article, specifically the coefficient of friction and the horizontal compression strength, are only minimally affected, if at all. This indicates that the low friction coating remains adhered to the surface of the glass following elevated temperature exposure and continues to protect the glass article from mechanical insults such as abrasions, impacts and the like.

In the embodiments described herein, a coated glass article is considered to be thermally stable if the coated glass article meets both a coefficient of friction standard and a horizontal compression strength standard after heating to the specified temperature and remaining at that temperature for the specified time. To determine if the coefficient of friction standard is met, the coefficient of friction of a first coated glass article is determined in as-received condition (i.e., prior to any thermal exposure) using the testing jig depicted in FIG. 4 and a 30 N applied load. A second coated glass article (i.e., a glass article having the same glass composition and the same coating composition as the first coated glass article) is thermally exposed under the prescribed conditions and cooled to room temperature. Thereafter, the coefficient of friction of the second glass article is determined using the testing jig depicted in FIG. 4 to abrade the coated glass article with a 30 N applied load resulting in an abraded (i.e., a "scratch") having a length of approximately 20 mm. If the coefficient of friction of the second coated glass article is less than 0.7 and the surface of the glass of the second glass article in the abraded area does not have any observable damage, then the coefficient of friction standard is met for purposes of determining the thermal stability of the low friction coating. The term "observable damage," as used herein means that the surface of the glass in the abraded area of the glass article contains less than six glass checks per 0.5 cm of length of the abraded area when observed with a Nomarski or differential interference contrast (DIC) spectroscopy microscope at a magnification of 100X with LED or halogen light sources. A standard definition of a glass check or glass checking is described in G. D. Quinn, "NIST Recommended Practice Guide: Fractography of Ceramics and Glasses," NIST special publication 960-17 (2006).

To determine if the horizontal compression strength standard is met, a first coated glass article is abraded in the testing jig depicted in FIG. 4 under a 30 N load to form a 20 mm scratch. The first coated glass article is then subjected to a horizontal compression test, as described herein, and the retained strength of the first coated glass article is determined. A second coated glass article (i.e., a glass article having the same glass composition and the same coating composition as the first coated glass article) is thermally exposed under the prescribed conditions and cooled to room temperature. Thereafter, the second coated glass article is abraded in the testing jig depicted in FIG. 4 under a 30 N load. The second coated glass article is then subjected to a horizontal compression test, as described herein, and the retained strength of the second coated glass article is determined. If the retained strength of the second coated glass article does not decrease by more than about 20% relative to the first coated glass article then the horizontal compression strength standard is met for purposes of determining the thermal stability of the low friction coating.

In the embodiments described herein, the coated glass containers are considered to be thermally stable if the coefficient of friction standard and the horizontal compression strength standard are met after exposing the coated glass containers to a temperature of at least about 260° C. for a time period of about 30 minutes (i.e., the coated glass containers are thermally stable at a temperature of at least about 260° C. for a time period of about 30 minutes). The thermal stability may also be assessed at temperatures from about 260° C. up to about 400° C. For example, in some embodiments, the coated glass containers will be considered to be thermally stable if the standards are met at a temperature of at least about 270° C. or even about 280° C. for a time period of about 30 minutes. In still other embodiments, the coated glass containers will be considered to be thermally stable if the standards are met at a temperature of at least about 290° C. or even about 300° C. for a time period of about 30 minutes. In further embodiments, the coated glass containers will be considered to be thermally stable if the standards are met at a temperature of at least about 310° C. or even about 320° C. for a time period of about 30 minutes. In still other embodiments, the coated glass containers will be considered to be thermally stable if the standards are met at a temperature of at least about 330° C. or even about 340° C. for a time period of about 30 minutes. In yet other embodiments, the coated glass containers will be considered to be thermally stable if the standards are met at a temperature of at least about 350° C. or even about 360° C. for a time period of about 30 minutes. In some other embodiments, the coated glass containers will be considered to be thermally stable if the standards are met at a temperature of at least about 370° C. or even about 380° C. for a time period of about 30 minutes. In still other embodiments, the coated glass containers will be considered to be thermally stable if the standards are met at a temperature of at least about 390° C. or even about 400° C. for a time period of about 30 minutes.

The coated glass containers disclosed herein may also be thermally stable over a range of temperatures, meaning that the coated glass containers are thermally stable by meeting the coefficient of friction standard and horizontal compression strength standard at each temperature in the range. For example, in the embodiments described herein, the coated glass containers may be thermally stable from at least about 260° C. to a temperature of less than or equal to about 400° C. In some embodiments, the coated glass containers may be thermally stable in a range from at least about 260° C. to about 350° C. In some other embodiments, the coated glass containers may be thermally stable from at least about 280° C. to a temperature of less than or equal to about 350° C. In still other embodiments, the coated glass containers may be thermally stable from at least about 290° C. to about 340° C. In another embodiment, the coated glass container may be thermally stable at a range of temperatures of about 300° C. to about 380° C. In another embodiment, the coated glass container may be thermally stable at a range of temperatures from about 320° C. to about 360° C.

The coated glass containers described herein have a four point bend strength. To measure the four point bend strength of a glass container, a glass tube that is the precursor to the coated glass container 100 is utilized for the measurement. The glass tube has a diameter that is the same as the glass container but does not include a glass container base or a glass container mouth (i.e., prior to forming the tube into a glass container). The glass tube is then subjected to a four point bend stress test to induce mechanical failure. The test is performed at 50% relative humidity with outer contact members spaced apart by 9" and inner contact members spaced apart by 3" at a loading rate of 10 mm/min.

The four point bend stress measurement may also be performed on a coated and abraded tube. Operation of the testing jig 200 may create an abrasion on the tube surface such as a surface scratch that weakens the strength of the tube, as described in the measurement of the horizontal compression strength of an abraded vial. The glass tube is then subjected to a four point bend stress test to induce mechanical failure. The test is performed at 25° C. and at 50% relative humidity using outer probes spaced apart by 9" and inner contact members spaced apart by 3" at a loading rate of 10 mm/min, while the tube is positioned such that the scratch is put under tension during the test.

In some embodiments, the four point bend strength of a glass tube with a low-friction coating after abrasion shows on average at least 10%, 20%, or even 50% higher mechanical strength than that for an uncoated glass tube abraded under the same conditions.

In some embodiments, after the coated glass container 100 is abraded by an identical glass container with a 30 N normal force, the coefficient of friction of the abraded area of the coated glass container 100 does not increase by more than about 20% following another abrasion by an identical glass container with a 30 N normal force at the same spot, or does not increase at all. In other embodiments, after the coated glass container 100 is abraded by an identical glass container with a 30 N normal force, the coefficient of friction of the abraded area of the coated glass container 100 does not increase by more than about 15% or even 10% following another abrasion by an identical glass container with a 30 N normal force at the same spot, or does not increase at all. However, it is not necessary that all embodiments of the coated glass container 100 display such properties.

Mass loss refers to a measurable property of the coated glass container 100 which relates to the amount of volatiles liberated from the coated glass container 100 when the coated glass container is exposed to a selected elevated temperature for a selected period of time. Mass loss is generally indicative of the mechanical degradation of the coating due to thermal exposure. Since the glass body of the coated glass container does not exhibit measureable mass loss at the temperatures reported, the mass loss test, as described in detail herein, yields mass loss data for only the low-friction coating that is applied to the glass container. Multiple factors may affect mass loss. For example, the amount of organic material that can be removed from the coating may affect mass loss. The breakdown of carbon backbones and side chains in a polymer will result in a theoretical 100% removal of the coating. Organometallic polymer materials typically lose their entire organic component, but the inorganic component remains behind. Thus, mass loss results are normalized based upon how much of the coating is organic and inorganic (e.g., % silica of the coating) upon complete theoretical oxidation.

To determine the mass loss, a coated sample, such as a coated glass vial, is initially heated to 150° C. and held at this temperature for 30 minutes to dry the coating, effectively driving off $H_2O$ from the coating. The sample is then heated from 150° C. to 350° C. at a ramp rate of 10° C./min in an oxidizing environment, such as air. For purposes of mass loss determination, only the data collected from 150° C. to 350° C. is considered. In some embodiments, the low-friction coating has a mass loss of less than about 5% of its mass when heated from a temperature of 150° C. to 350° C. at a ramp rate of about 10° C./minute. In other embodiments, the low-friction coating has a mass loss of less than about 3% or even less than about 2% when heated from a temperature of 150° C. to 350° C. at a ramp rate of about 10° C./minute. In some other embodiments, the low-friction coating has a mass loss of less than about 1.5% when heated from a temperature of 150° C. to 350° C. at a ramp rate of about 10° C./minute. In some other embodiments, the low-friction coating loses substantially none of its mass when heated from a temperature of 150° C. to 350° C. at a ramp rate of about 10° C./minute.

Mass loss results are based on a procedure wherein the weight of a coated glass container is compared before and after a heat treatment, such as a ramping temperature of 10°/minute from 150° C. to 350° C., as described herein. The difference in weight between the pre-heat treatment and post-heat treatment vial is the weight loss of the coating, which can be standardized as a percent weight loss of the coating such that the pre-heat treatment weight of the coating (weight not including the glass body of the container and following the preliminary heating step) is known by comparing the weight on an uncoated glass container with a pre-treatment coated glass container. Alternatively, the total mass of coating may be determined by a total organic carbon test or other like means.

Figure 5:
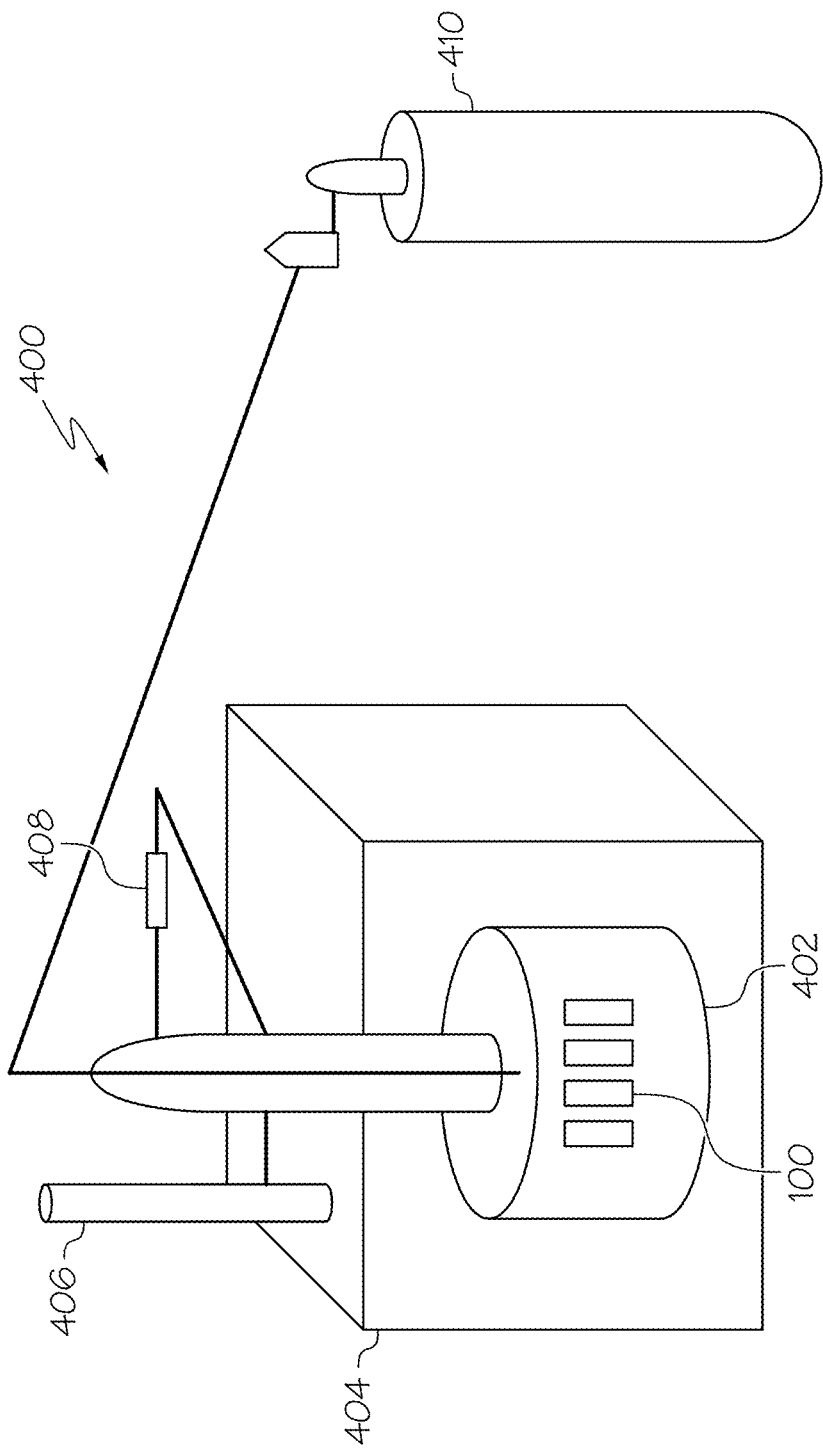
FIG. 5 schematically depicts an apparatus for testing the mass loss of a coating on a glass container, according to one or more embodiments shown and described herein.

Outgas sing refers to a measurable property of the coated glass container 100 which relates to the amount of volatiles liberated from the coated glass container 100 when the coated glass container is exposed to a selected elevated temperature for a selected period of time. Outgassing measurements are reported herein as an amount by weight of volatiles liberated per the surface area of the glass container having the coating during exposure to the elevated temperature for a time period. Since the glass body of the coated glass container does not exhibit measureable outgassing at the temperatures reported for outgassing, the outgassing test, as described in detail above, yields outgassing data for substantially only the low-friction coating that is applied to the glass container. Outgassing results are based on a procedure wherein a coated glass container 100 is placed in a glass sample chamber 402 of the apparatus 400 depicted in FIG. 5. A background sample of the empty sample chamber is collected prior to each sample run. The sample chamber is held under a constant 100 ml/min air purge as measured by rotometer 406 while the furnace 404 is heated to 350° C. and held at that temperature for 1 hour to collect the chamber background sample. Thereafter, the coated glass container 100 is positioned in the sample chamber 402 and the sample chamber 402 is held under a constant 100 ml/min air purge and heated to an elevated temperature and held at temperature for a period of time to collect a sample from a coated glass container 100. The glass sample chamber is made of Pyrex, limiting the maximum temperature of the analysis to 600° C. A Carbotrap 300 adsorbent trap 408 is assembled on the exhaust port of the sample chamber to adsorb the resulting volatile species as they are released from the sample and are swept over the absorbent resin by the air purge gas 410 where the volatile species are adsorbed. The absorbent resin is then placed directly into a Gerstel Thermal Desorption unit coupled directly to a Hewlett Packard 5890 Series II gas chromatograph/Hewlett Packard 5989 MS engine. Outgassing species are thermally desorbed at 350° C. from the adsorbent resin and cryogenically focused at the head of a non-polar gas chromatographic column (DB-5MS). The temperature within the gas chromatograph is increased at a rate of 10° C./min to a final temperature of 325° C., so as to provide for the separation and purification of volatile and semi-volatile organic species. The mechanism of separation has been demonstrated to be based on the heats of vaporization of different organic species resulting in, essentially, a boiling point or distillation chromatogram. Following separation, purified species are analyzed by traditional electron impact ionization mass spectrometric protocols. By operating under standardized conditions, the resulting mass spectra may be compared with existing mass spectral libraries.

In some embodiments, the coated glass containers described herein exhibit an outgas sing of less than or equal to about 54.6 $ng/cm^2$, less than or equal to about 27.3 $ng/cm^2$, or even less than or equal to about 5.5 $ng/cm^2$ during exposure to elevated temperature of about, 250° C., about 275° C., about 300° C., about 320° C., about 360° C., or even about 400° C. for time periods of about 15 minutes, about 30 minutes, about 45 minutes, or about 1 hour. Furthermore, the coated glass containers may be thermally stable in a specified range of temperatures, meaning that the coated containers exhibit a certain outgassing, as described above, at every temperature within the specified range. Prior to outgassing measurements, the coated glass containers may be in as-coated condition (i.e., immediately following application of the low-friction coating) or following any one of depyrogenation, lyophilization, or autoclaving. In some embodiments, the coated glass container 100 may exhibit substantially no outgassing.

In some embodiments, outgassing data may be used to determine mass loss of the low-friction coating. A pre-heat treatment coating mass can be determined by the thickness of the coating (determined by SEM image or other manner), the density of low-friction coating, and the surface area of the coating. Thereafter, the coated glass container can be subjected to the outgassing procedure, and mass loss can be determined by finding the ratio of the mass expelled in outgassing to the pre-heat treatment mass.

The transparency and color of the coated container may be assessed by measuring the light transmission of the container within a range of wavelengths between 400-700 nm using a spectrophotometer. The measurements are performed such that a light beam is directed normal to the container wall such that the beam passes through the low-friction coating twice, first when entering the container and then when exiting it. In some embodiments, the light transmission through the coated glass container may be greater than or equal to about 55% of a light transmission through an uncoated glass container for wavelengths from about 400 nm to about 700 nm. As described herein, a light transmission can be measured before a thermal treatment or after a thermal treatment, such as the heat treatments described herein. For example, for each wavelength of from about 400 nm to about 700 nm, the light transmission may be greater than or equal to about 55% of a light transmission through an uncoated glass container. In other embodiments, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

As described herein, a light transmission can be measured before an environmental treatment, such as a thermal treatment described herein, or after an environmental treatment. For example, following a heat treatment of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, or after exposure to lyophilization conditions, or after exposure to autoclave conditions, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

Figure 11:
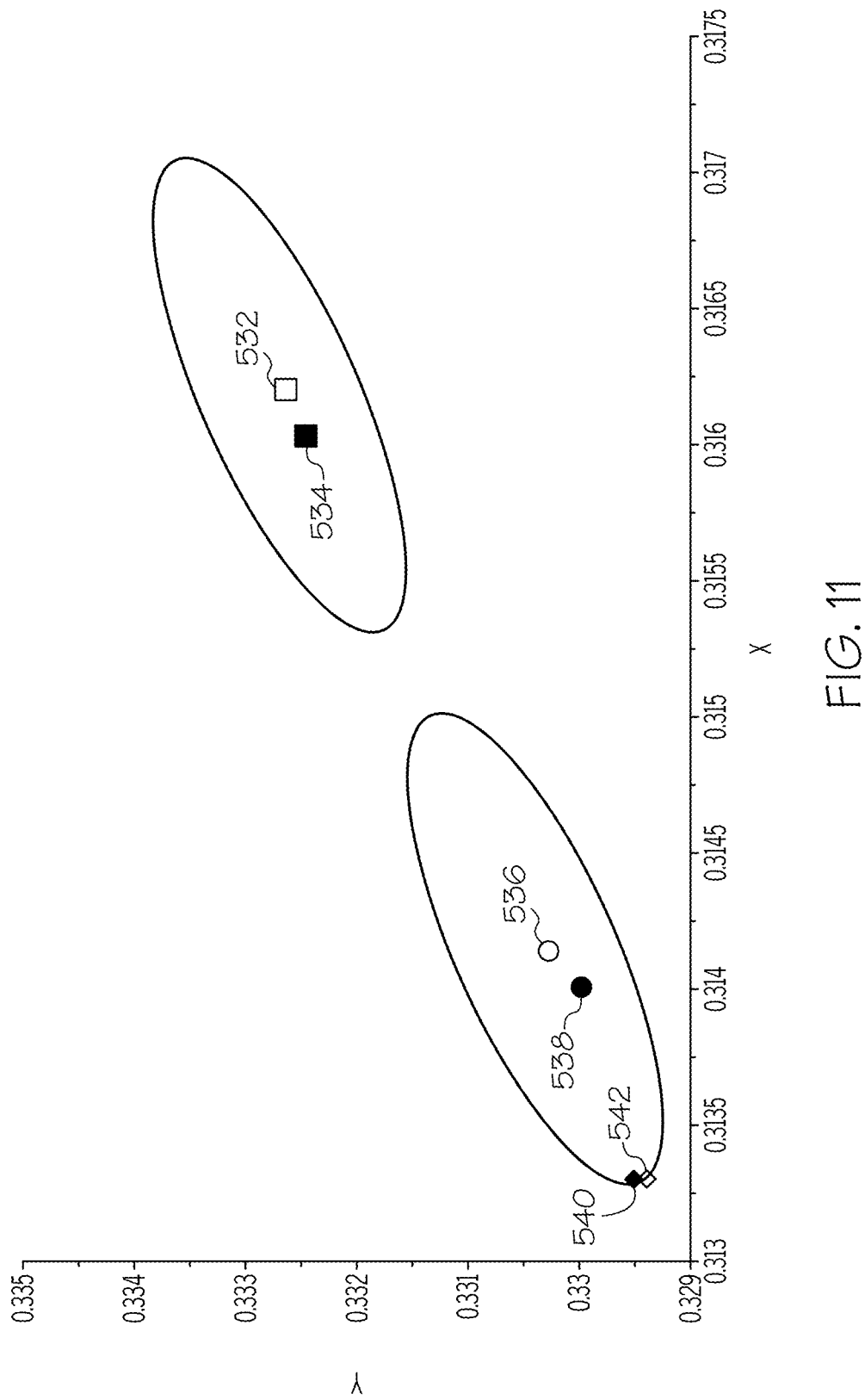
FIG. 11 graphically depicts color data for glass containers comprising fluorinated polyimide siloxane coatings, according to one or more embodiments shown and described herein.

The yellowing caused by exposure to heat treatments can be measured by x and y coordinates according to the CEI 1931 color space, such as shown in FIG. 11. Change in x and y coordinates following depyrogenation conditions may evidence yellowing of the coated glass article.

In some embodiments, the coated glass container 100 may be perceived as colorless and transparent to the naked human eye when viewed at any angle. In some other embodiments, the low-friction coating 120 may have a perceptible tint, such as when the low-friction coating 120 comprises a polyimide formed from poly(pyromellitic dianhydride-co-4,4'-oxydianiline) amic acid commercially available from Aldrich.

In some embodiments, the coated glass container 100 may have a low-friction coating 120 that is capable of receiving an adhesive label. That is, the coated glass container 100 may receive an adhesive label on the coated surface such that the adhesive label is securely attached. However, the ability of attachment of an adhesive label is not a requirement for all embodiments of the coated glass containers 100 described herein.

EXAMPLES

The various embodiments of glass containers with low-friction coatings will be further clarified by the following examples. The examples are illustrative in nature, and should not be understood to limit the subject matter of the present disclosure.

Example 1

A fluorinated polyimide siloxane referred to herein as "Silimide-6F 50/50" was prepared in powder form from 2,2-Bis(4-aminophenyl)hexafluoropropane (6F), 1,3-bis(3-aminopropyl)-1,1,3,3-tetramethyl-disiloxane (BADS), and 4'4'-(Hexafluoroisopropylidene) diphthalic Anhydride (6FDA). The molar ratio of 6F:BADS:6FDA was 1:1:2.

First, 2,2-Bis(4-aminophenyl)hexafluoropropane (3.75 g, 11.2 mmol) was weighed in a 250 ml three necks round bottom flask containing N-methyl pyrrolidone (50 ml), equipped with two septa, a DeanStarck trap equipped with an oil bubbler filled with mineral or silicone oil. The flask was purged with argon gas and after complete dissolution 1,3-bis(3-aminopropyl)-1,1,3,3-tetramethyl-disiloxane (2.8 g, 11.2 mmol) was added and the solution was stirred. After about 15 minutes of stirring, 4'4'-(Hexafluoroisopropylidene) diphthalic Anhydride, (10.00 g., 22.5 mmol) was added quickly under argon atmosphere at room temperature. After about 30 minutes of mixing at a temperature not exceeding 60° C., the resulting low viscosity solution was slowly heated to 190° C. under continuous gentle argon flow. The reaction solution was allowed to stir at 190° C. for 3 hours with a total of about 5 ml distillates (water and N-methyl pyrrolidone) to allow the imidization to occur. The moderately viscous, orange-golden reaction solution was cooled to room temperature. 50 ml of fresh NMP was added to this orange-golden reaction solution to reduce the viscosity and this low viscosity solution was added dropwise into 2-propanol (2000 ml) under moderate agitation. The white precipitate was filtered using a 50 µm aperture nylon mesh screen. The solid collected was suspended in isopropyl alcohol and filtered one more time. Finally the wet solid was dried under vacuum until a free flowing powder was obtained. The polymer powder was stored in the fridge at 4° C. before use.

This polyimide was found to be soluble in various solvents including fast or moderate evaporation rate solvents such as ethyl acetate, propyleneglycol methyl ether acetate, toluene, acetone, 2-butanone, etc.

Figure 6:
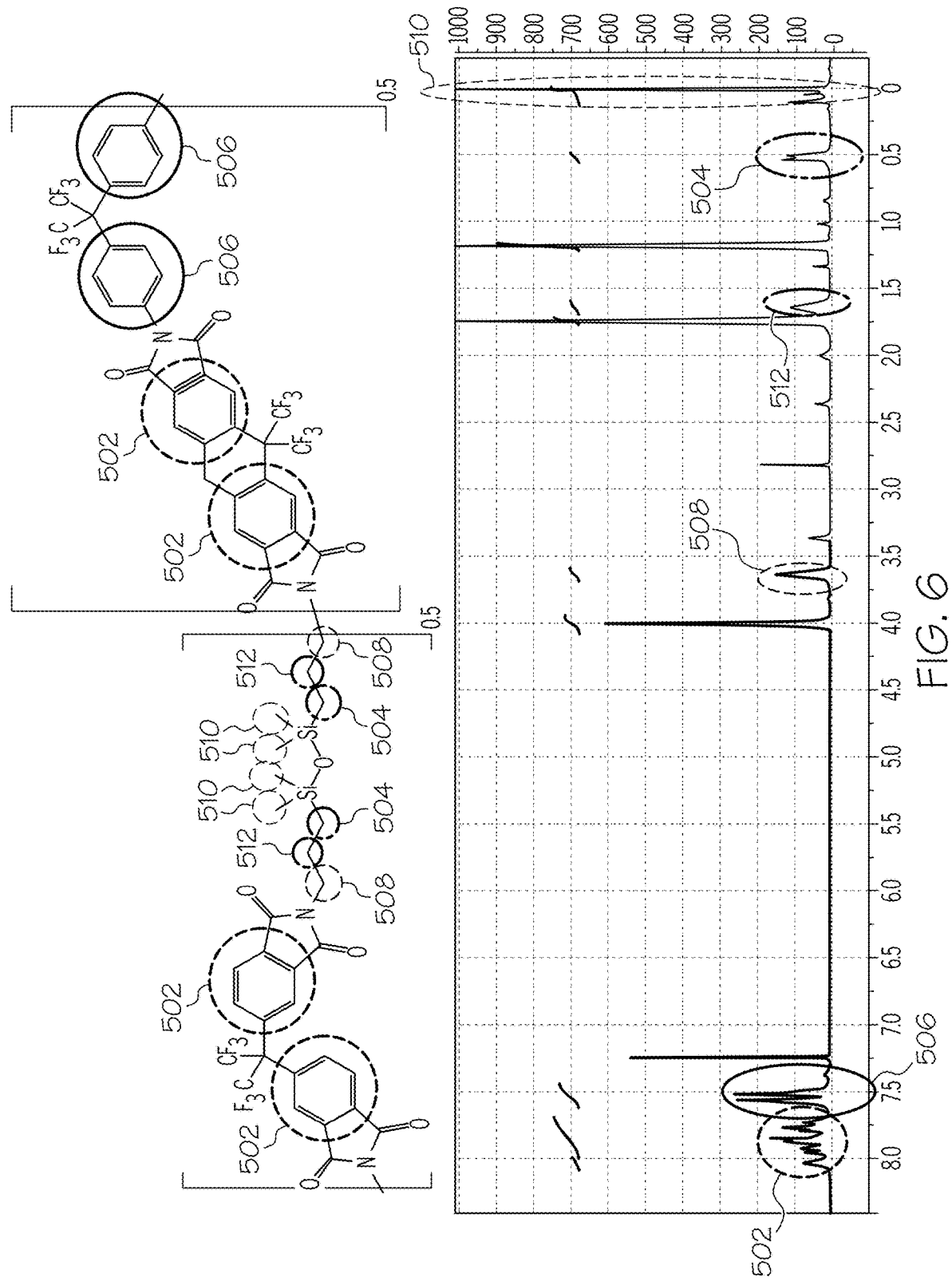
FIG. 6 depicts a 1H-NMR spectrum of a fluorinated polyimide siloxane chemical composition, according to one or more embodiments shown and described herein.

The formed polyimide was analyzed using 1H-NMR spectroscopy. FIG. 6 shows the 1H-NMR spectrum of the fluorinated polyimide siloxane chemical composition that was formed as Example 1. Reference numbers 504, 506, 508, 510, and 512 depict the portions of the 1H-NMR spectrum that correspond to like moieties in the formed fluorinated polyimide siloxane.

Figure 7:
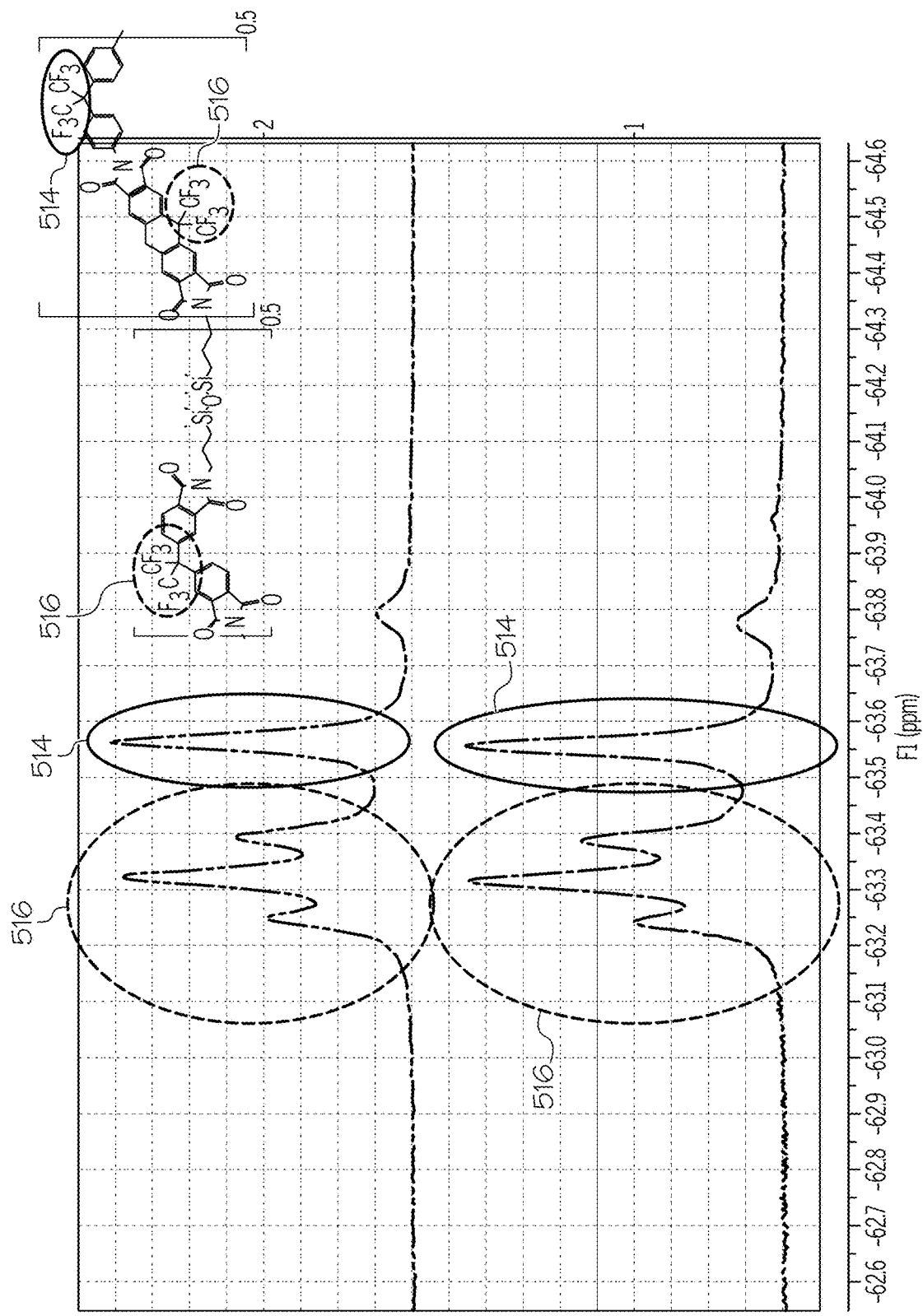
FIG. 7 depicts a 19F-NMR spectrum of a fluorinated polyimide siloxane chemical composition, according to one or more embodiments shown and described herein.

The formed polyimide was also analyzed using 19F-NMR spectroscopy. FIG. 7 shows the 19F-NMR spectrum of the fluorinated polyimide siloxane chemical composition that was formed as Example 1. Reference numbers 514 and 516 depict the portions of the 19F-NMR spectrum that correspond to like moieties in the formed fluorinated polyimide siloxane.

Example 2

Glass vials were coated with a layer of aminopropyl silsesquioxane and a layer of the fluorinated polyimide siloxane (Silimide-6F 50/50) of Example 1.

Glass vials were formed from the glass composition of Composition E in Table 1 of U.S. patent application Ser. No. 13/660,394 entitled "Glass Compositions with Improved Chemical and Mechanical Durability." The glass vials were subsequently ion-exchange strengthened prior to application of a coating, as is described in U.S. patent application Ser. No. 13/660,394.

A 23.5 wt. % aminopropylsilsesquioxane aqueous solution (available as AB127715 from ABCR) was diluted with methanol to obtain a 2% wt/v silsesquioxane solution.

The vials were washed with de-ionized water, blown dry with nitrogen, and finally cleaned by exposure to an oxygen plasma for 15 seconds prior to coating. Then the vials were dip coated with the 2% solution of the silsesquioxane solution prepared above (withdrawing speed was 80 cm/min). The silsesquioxane coated vials were dried at room temperature for 10 minutes. The vials were then dipped into the Silimide-6F 50/50 solution prepared by dissolving 2.5 g Silimide-6F powder, as synthesized in Example 1, in 100 ml n-propyl acetate solvent (withdrawing speed was 20 cm/min.)

Thereafter, the coatings were cured by placing the coated vials into a preheated furnace at 360° C. for 30 minutes.

Figure 10:
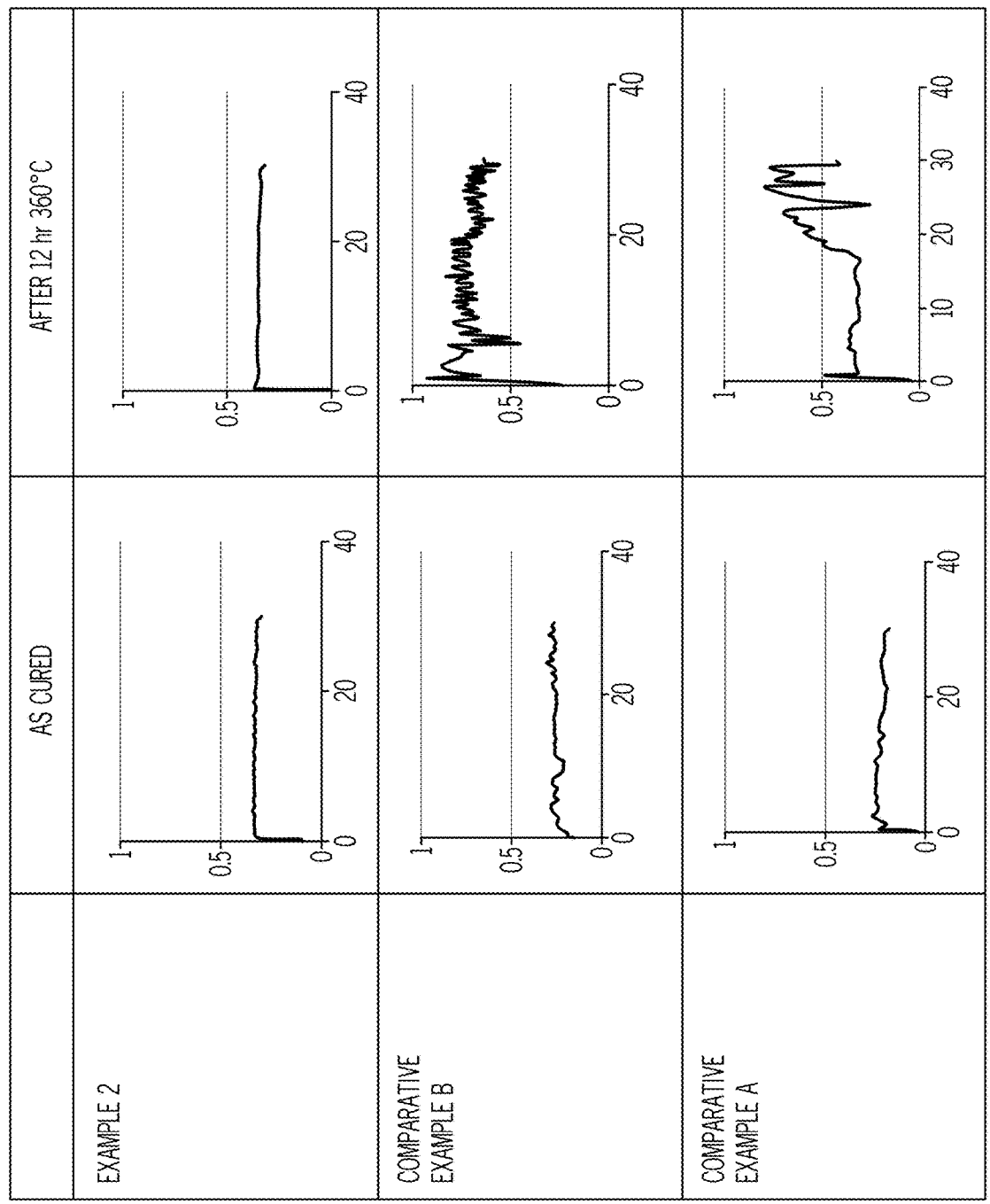
FIG. 10 graphically depicts coefficient of friction data for coated glass containers, according to one or more embodiments shown and described herein.

After curing, the vials coated with the Silimide-6F had no visible color. The coating exhibited a low coefficient of friction in vial-to-vial contact tests and very good glass protection. FIG. 10 depicts the coefficient of friction (on the y-axis) of coated glass containers at loads of up to 30 N (x-axis) for the coated glass container of Example 2 as cured and following depyrogenation for 12 hours at 360° C.

Example 3

Glass vials were coated with a layer of 3-aminopropyltrimethoxy silane and a layer of the fluorinated polyimide siloxane (Silimide-6F) from Example 1.

Ion-exchanged vials as described in Example 2 were coated successively with a 3-aminopropyltrimethoxy silane ("GAPS") layer and Silimide-6F 50/50 prepared in Example 1. The coating procedure was identical to that described in Example 2 except that the silsesquioxane tie layer of Example 2 was replaced by a GAPS hydrolysate prepared by mixing 0.51 g GAPS (0.0028 mol) weighted in a 15 ml centrifuge tube with 0.075 ml de-ionized water (0.0042 mol) and 20 µl of 37 wt. % HCl. The solution was stirred overnight and then was diluted with methanol to obtain a final 2% Wt/V solution of GAPS coating solution.

Example 4

Glass vials were coated with a layer of 1-[3-(Trimethoxysilyl)propyl]urea ("TMSPU") and a layer of the fluorinated polyimide siloxane (Silimide-6F) from Example 1.

Ion-exchanged vials as described in Example 2 were coated successively with a 1-[3-(Trimethoxysilyl)propyl] urea (TMSPU) layer and Silimide-6F 50/50 prepared in Example 1. The coating procedure was identical to that described in Example 2 except that the silsesquioxane tie layer of Example 2 was replaced by a TMSPU prepared by mixing 0.622 g TMSPU (0.0028 mol) placed in a 15 ml plastic tube with 0.060 ml de-ionized water (0.0033 mol) and 20 µl of 37 wt. % HCl. The solution was stirred overnight and then was diluted with methanol to obtain a final 2% Wt/V solution.

FIG. 11 depicts X-Y color coordinates for the coated glass containers of Example 4 after depyrogenation for 12 hours at 360° C. Points 536 and 538 represent the color data of Example 4 (where point 538 is as cured and point 536 is following depyrogenation) and points 540 and 542 represent the color of an uncoated glass container (as cured and following depyrogenation). The McAdams ellipse shows that Example 4 did not have a color change detectable by the human eye.

Example 5

A fluorinated polyimide siloxane referred to herein as "Silimide-6F 25/75" was prepared in powder form from 2,2-Bis(4-aminophenyl)hexafluoropropane (6F), 1,3-bis(3-aminopropyl)-1,1,3,3-tetramethyl-disiloxane (BADS), and 4'4'-(Hexafluoroisopropylidene) diphthalic Anhydride (6FDA). The molar ratio of 6F:BADS:6FDA was 1:3:4.

First 2,2-Bis(4-aminophenyl)hexafluoropropane (5.61 g, 16.8 mmol) was weighed in a 250 ml three neck round bottom flask containing N-methyl pyrrolidone (50 ml), equipped with two septa, a DeanStarck trap equipped with oil bubblers filled with mineral or silicone oil. The flask was purged with argon gas and after complete dissolution, 1,3-bis(3-aminopropyl)-1,1,3,3-tetramethyl-disiloxane (1.39 g, 5.59 mmol) was added and the solution was stirred. After about 15 min stirring, 4,4'-(Hexafluoroisopropylidene) diphthalic Anhydride, (10.00 g., 22.5 mmol) was added quickly under argon atmosphere at room temperature. After about 30 min of mixing at a temperature not exceeding 60° C., the resulting low viscosity solution was slowly heated to 190° C. under continuous gentle argon flow. The reaction solution was allowed to stir at 190° C. for 3 hours with a total of about 5 ml distillates (water and N-methyl pyrrolidone) to allow the imidization to occur. The moderately viscous, orange-golden reaction solution was cooled to room temperature. 50 ml of fresh NMP was added to this orange-golden reaction solution to reduce the viscosity and this low viscosity solution was added dropwise into 2-propanol (2000 ml) under moderate agitation. The white precipitate was filtered using a 50 µm aperture nylon mesh screen. The solid collected was suspended in isopropyl alcohol and filtered one more time. Finally the wet solid was dried under vacuum until a free flowing powder was obtained. The polymer composition and purity (presence of monomers and residual solvent) was checked by NMR and FTIR. The polymer powder was stored in the fridge at 4° C. before use.

Example 6

Glass vials were coated with a layer of the fluorinated polyimide siloxane (Silimide-6F 50/50) from Example 1. The Silimide-6F was deposited directly onto the glass vial (i.e., without an intermediate coupling agent layer).

Ion-exchanged vials as described in Example 2 were washed with de-ionized water, blown dry with nitrogen, and finally cleaned by exposure to an oxygen plasma for 15 seconds prior coating. The vials were then dipped into a Silimide 6F 50:50 solution prepared by dissolving 2.5 g Silimide-6F 50:50 powder, as synthesized in Example 1, in 100 ml propylene glycol methyl ether acetate, (DOWA- NOL™ PMA) solvent (withdrawing speed was 20 cm/min). Thereafter, the coatings were cured by placing the coated vials into a preheated furnace at 360° C. for 15 minutes.

After curing, the vials coated with the Silimide-6F 50:50 had no visible color. The coating exhibited a low coefficient of friction in vial-to-vial contact tests (COF of 0.30 to 0.35) and very good glass protection. The performances of coating against scratch was also evaluated after a series of depyrogenations at different temperatures. Silimide-6F 50:50 kept retained about the same properties (COF<0.50 and good glass protection) after 4 hrs at 270° C., 12 hrs at 300° C. and autoclave treatment (20 min 121° C.). No decrease of performances was observed after these post treatments and no discoloration was observed, whatever thermal treatment applied.

Example 7

Glass vials were coated with a layer of the fluorinated polyimide siloxane (Silimide-6F 25/75) from Example 5. The Silimide-6F 25/75 was deposited directly onto the glass vial (i.e., without an intermediate coupling agent layer).

Ion-exchanged vials as described in Example 2 were coated with a Silimide-6F 25/75 prepared in Example 5. The coating procedure was identical to that described in Example 6 except that the Silimide-6F 50/50 coating of Example 6 was replaced by a Silimide-6F 25/75 coating prepared by dissolving 2.50 g Silimide-6F 25:75 powder in 100 ml propylene glycol methyl ether Acetate, (DOWANOL™ PMA), solvent. Dip coating was made at 40 cm/min to obtain the same thickness as that of the Silimide-6F 50:50 coating of Example 6 (about 50 nm thick as measured with ZYGO on microscope slides coated and cured in same experimental conditions). The curing step of the coated vials was similar to the one described in Example 6. The coating obtained from Silimide-6F 25/75 exhibited about the same low coefficient of friction and same good glass protection as Example 6 with the Silimide-6F 50:50 coating. The properties of this coating were also maintained after the same series of depyrogenations and autoclave treatment. Samples even survived depyrogenation of 12 hours at 360° C., with no or only few checks into glass substrate after scratch test under a 30 N load.

Figure 8:
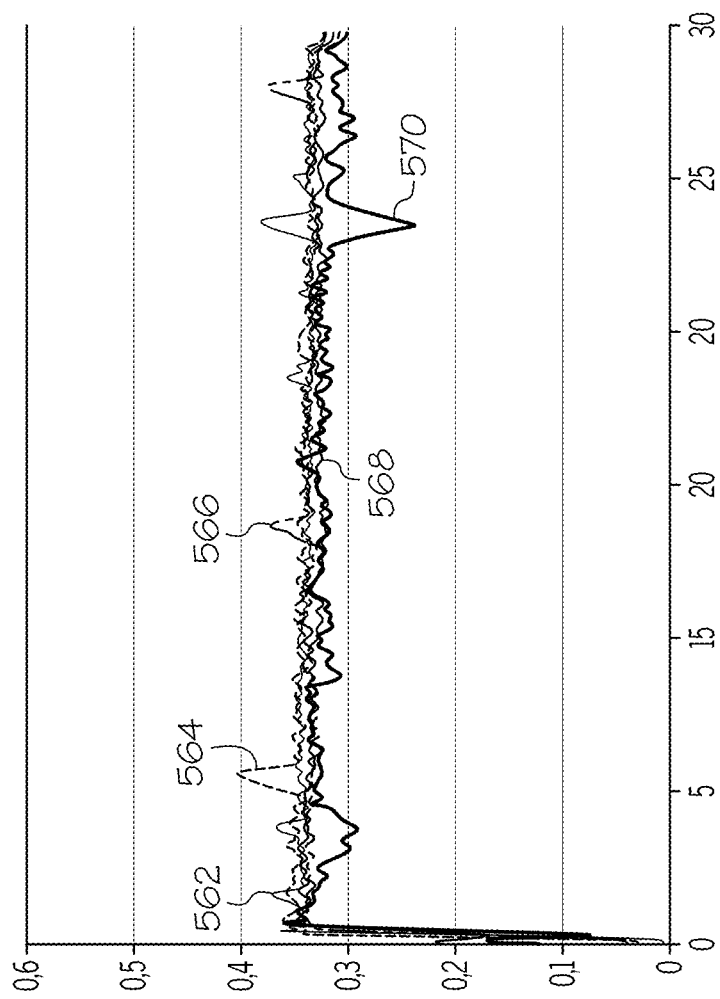
FIG. 8 graphically depicts coefficient of friction data for coated glass containers, according to one or more embodiments shown and described herein.

FIG. 8 depicts the coefficient of friction (on the y-axis) of coated glass containers of Example 7 at loads of up to 30 N (x-axis) following various thermal treatments. Reference number 562 corresponds to COF after depyrogenation for 12 hours at 360° C., reference number 564 corresponds to COF after depyrogenation for 12 hours at 300° C., reference number 566 corresponds to COF after depyrogenation for 4 hours at 270° C., reference number 568 corresponds to COF after curing for 15 minutes at 360° C., and reference number 570 corresponds to COF after autoclave for 20 minutes at 121° C.

Figure 13:
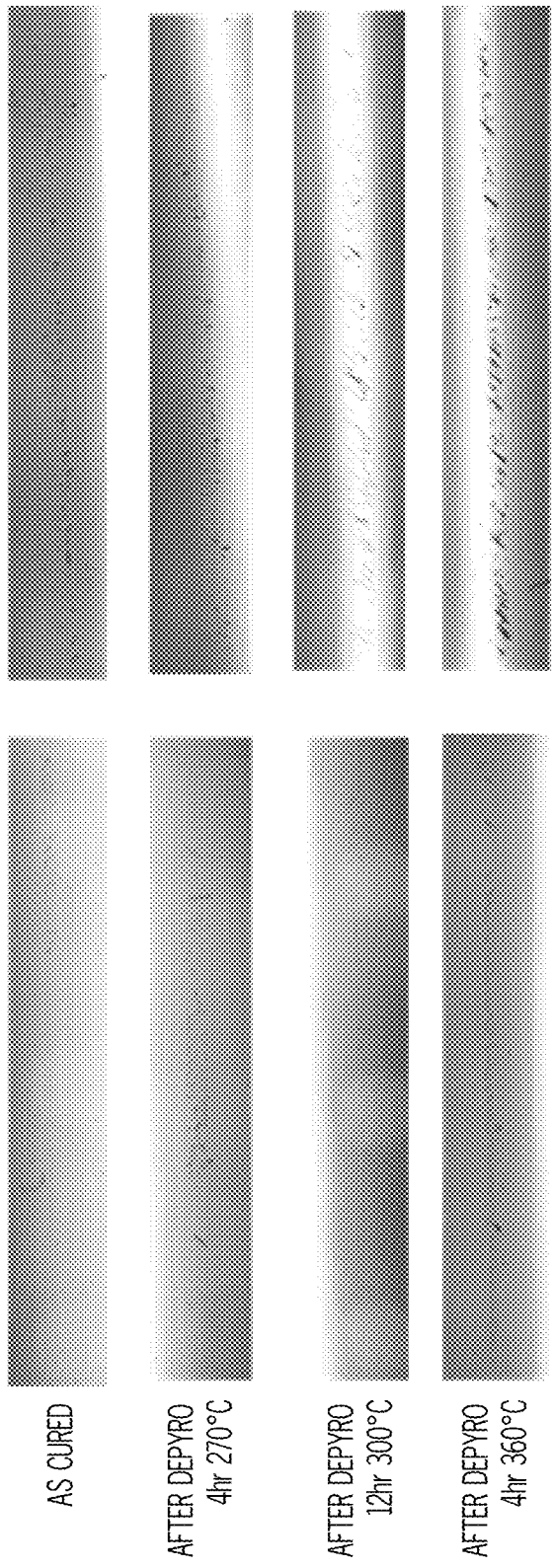
FIG. 13 shows optical micrograph images of coated glass containers following scratching after on a vial-on-vial jig various thermal treatments, according to one or more embodiments shown and described herein.

FIG. 13 shows optical micrograph images of coated glass containers following COF testing after for various thermal treatments and as cured for the coated glass container of Example 7.

Example 8

A polyimide siloxane was prepared from 1 monomer parts 4'4'-(Hexafluoroisopropylidene) diphthalic Anhydride (6FDA) to 1 monomer parts 2,2-Bis(4-aminophenyl) hexafluoropropane (6F). Preparation of the polymer was similar to that described in Example 1. Thereafter, ion-exchanged glass vials described in Example 2 were coated with the synthesized monomer in a process similar as that described in Example 6.

Example 9

A polyimide siloxane was prepared from 1 monomer parts 4'4'-(Hexafluoroisopropylidene) diphthalic Anhydride (6FDA) to 1 monomer parts 1,3-bis(3-aminopropyl)-1,1,3,3-tetramethyl-disiloxane (BADS). Preparation of the polymer was similar to that described in Example 1. Preparation of the polymer was similar to that described in Example 1. Thereafter, ion-exchanged glass vials described in Example 2 were coated with the synthesized monomer in a process similar as that described in Example 6.

Figure 9:
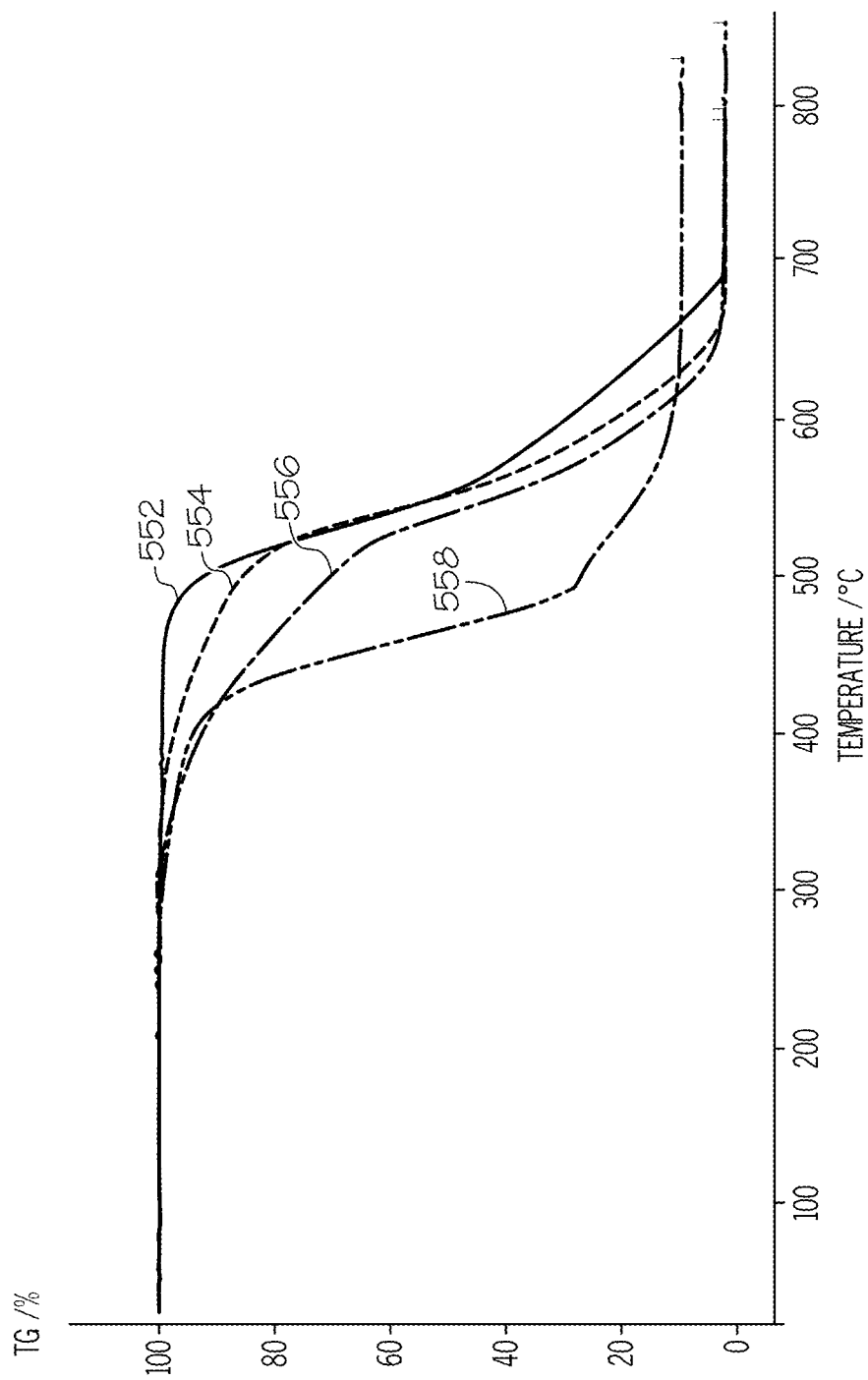
FIG. 9 graphically depicts mass loss data for coated glass containers, according to one or more embodiments shown and described herein.

FIG. 9 depicts mass loss as measured by a TGA as described herein for the polymers of Examples 1, 5, 8, and 9. Reference number 552 corresponds to the polymer of Example 8, reference number 554 corresponds to the polymer of Example 5, reference number 556 corresponds to the polymer of Example 1, and reference number 558 corresponds to the polymer of Example 9. The data of FIG. 9 is further depicted in Table 1, below.

TABLE 1

|  | % mass @ 360° C. | T ° C. @ mass loss = 1% | T ° C. @ mass loss = 5% |
| --- | --- | --- | --- |
| Example 9 | 99.5% | 458° C. | 492° C. |
| Example 5 | 99.2% | 367° C. | 429° C. |
| Example 1 | 96.9% | 330° C. | 380° C. |
| Example 8 | 97.2% | 311° C. | 391° C. |

Comparative Example A

Glass vials were coated with a layer of mixed aminophenyltrimethoxy silane ("APhTMS") and 3-aminopropyltrimethoxy silane ("GAPS"), and a layer of Poly(pyromellitic dianhydride-co-4,4'-oxydianiline).

Poly(pyromellitic dianhydride-co-4,4'-oxydianiline) amic acid ("PMDA-ODA") was used as a comparative polyimide. Since the fully imidized form of this polyimide is insoluble in organic solvent and since its polyamic acid form is not soluble in fast evaporating solvents, the PMDA-ODA was converted into its polyamic acid salt by mixing 10 g PMDA-ODA polyamic acid solution (12.0 wt. %±0.5 wt. % [80% NMP/20% xylene] available from Sigma Aldrich) with 1.16 g of triethylamine. After vigorous agitation, 28.84 g of methanol were added to form 3% wt solution.

To prepare the mixed APhTMS and GAPS coating, to 100 ml of a 25:75 v/v water/methanol mixture were added 1 g GAPS and 1 g APHTMS. The final solution has a total silane concentration of 2% wt/v. This solution was prepared 24 hours before use to allow silane hydrolysis to occur.

A set of vials was coated successively coated with a mixture of APhTMS, and GAPS layer by coating with 0.5% PMDA-ODA polyamic acid salt in methanol. The coated vials were cured for 15 min at 360° C. and depyrogenated 12 hrs at 360° C. Samples undepyrogenated (as-cured) and depyrogenated were scratched in vial-on-vial jig at 30 N normal loads.

The vials coated with the solution of poly(pyromellitic dianhydride-co-4,4'oxydianiline) exhibited a low coefficient of friction in vial-to-vial contact tests and were yellow in color.

FIG. 10 depicts the coefficient of friction (on the y-axis) of coated glass containers at loads of up to 30 N (x-axis) for the coated glass container of Comparative Example A as cured and following depyrogenation for 12 hours at 360° C.

Comparative Example B

Glass vials were coated with a layer of TMSPU and a layer of PMDA-ODA.

The TMSPU tie layer was prepared as described in Example 4 and PMDA-ODA solution was prepared as described in Comparative Example A. Withdrawing speed were 80 cm/min and 20 cm/min for the TMSPU and the PMDA-ODA coatings, respectively. The coated vials were cured for 15 min at 360° C. and depyrogenated 12 hours at 360° C. Samples undepyrogenated (as-cured) and depyrogenated were scratched in vial-on-vial jig at 30 N normal loads. The vials coated with the solution of poly(pyromellitic dianhydride-co-4,4'oxydianiline) and TMSPU tie layer exhibited an unacceptably high coefficient of friction. The high coefficient of friction may be ascribed to a poor adhesion of the PMDA-ODA to the TMSPU tie layer.

FIG. 10 depicts the coefficient of friction (on the y-axis) of coated glass containers at loads of up to 30 N (x-axis) for the coated glass container of Comparative Example B as cured and following depyrogenation for 12 hours at 360° C.

Comparative Example C

Glass vials were coated with a layer of APhTMS and GAPS, and a layer of the fluorinated polyimide siloxane (Silimide-6F 50/50) from Example 1.

The coating procedure of the APhTMS/GAPS mixed layer was identical to that described in Comparative Example A. Following coating of the APhTMS/GAPS layer, Silimide-6F 50/50 of was applied as described in Example 2, except over a APhTMS/GAPS layer instead of a APS layer.

FIG. 11 depicts X-Y color coordinates for the coated glass containers of Comparative Example C after depyrogenation for 12 hours at 360° C. Points 533 and 534 represent the color data of Comparative Example C (where point 534 is as cured and point 532 is following depyrogenation) and points 540 and 542 represent the color of an uncoated glass container (before and after depyrogenation). The McAdams ellipse shows that Comparative Example C had a color change detectable by the human eye.

Table 2, shown below, shows COF and yellowing index for various examples, where for COF testing, two sample vials for each example were tested. The yellowness index was also determined according to ASTM E313 testing method. The yellowing index reported in Table 2 is for D65 illumination at a 2° observer angle. Comparative Examples A and C had visible yellowing and Comparative Example B had a significantly increased COF following depyrogenation. Coated articles described herein may have a yellow index of less than or equal to about 10, 8, or even 6.

TABLE 2

| Example | COF as cured | COF after depyrogenation for 12 hours at 360° C. | Yellow Index |
|---|---|---|---|
| Example 2 | 0.32/0.34 | 0.35/0.41 | 2.47 |
| Example 3 | 0.32/0.33 | 0.34/0.37 | 4.25 |
| Example 4 | 0.31/0.33 | 0.34/0.39 | 1.55 |

TABLE 2-continued

| Example | COF as cured | COF after depyrogenation for 12 hours at 360° C. | Yellow Index |
|---|---|---|---|
| Comparative Example A | 0.13/0.17 | 0.17/0.21 | 18.05 |
| Comparative Example B | 0.29/0.34 | 0.76/3.21 | 3.8 |
| Comparative Example C | 0.28/0.31 | 0.24/0.27 | 11.88 |

Comparative Example D

Glass vials were coated with a layer of PMDA-ODA. The PMDA-ODA was deposited directly onto the glass vial (i.e., without an intermediate coupling agent layer). The PMDA solution was made similar to that in Comparative Example A and was applied directly onto the glass vial similar to the process in Comparative Example A.

Figure 12:
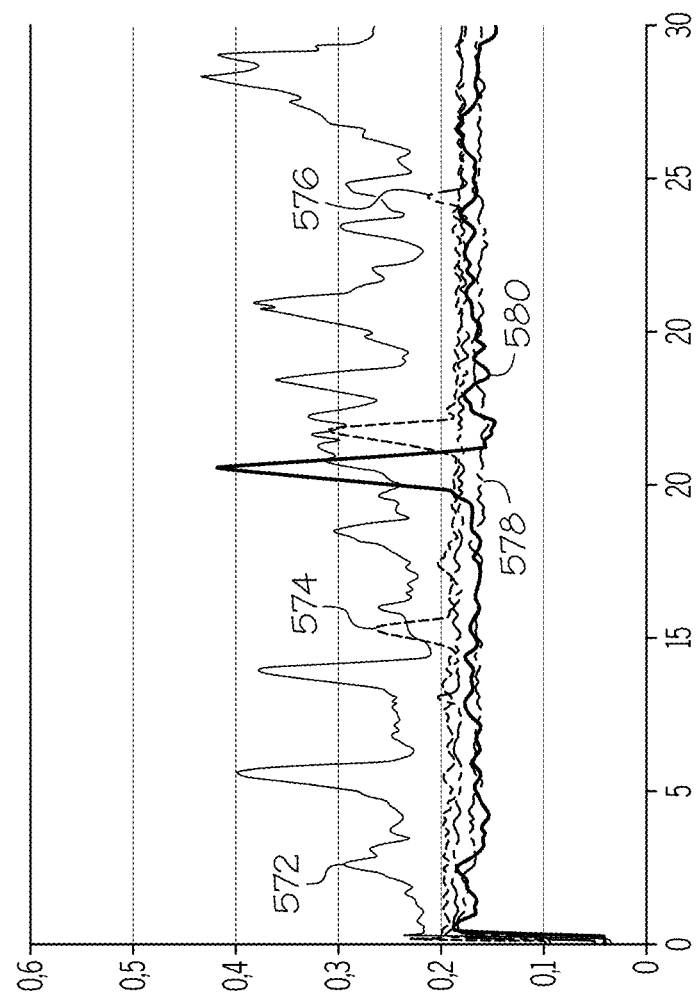
FIG. 12 graphically depicts coefficient of friction data for coated glass containers, according to one or more embodiments shown and described herein.

FIG. 12 depicts the coefficient of friction (on the y-axis) of coated glass containers of Comparative Example D at loads of up to 30 N (x-axis) following various thermal treatments. Reference number 572 corresponds to COF after depyrogenation for 12 hours at 360° C., reference number 574 corresponds to COF after depyrogenation for 12 hours at 300° C., reference number 576 corresponds to COF after depyrogenation for 4 hours at 270° C., reference number 578 corresponds to COF after curing for 15 minutes at 360° C., and reference number 580 corresponds to COF after autoclave for 20 minutes at 121° C.

FIG. 13 shows optical micrograph images of coated glass containers following COF testing after for various thermal treatments and as cured for the coated glass container of Comparative Example D.

It should now be understood that the glass containers with low frictive coatings described herein exhibit improved resistance to mechanical damage as a result of the application of the low frictive coating and, as such, the glass containers have enhanced mechanical durability. This property makes the glass containers well suited for use in various applications including, without limitation, pharmaceutical packaging materials.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:
1. A coated glass article comprising:
a glass container comprising a first surface and a second surface opposite the first surface; and
a low-friction coating bonded to at least a portion of the first surface of the glass container, the low-friction coating comprising a polyimide such that it is formed only from diamines and dianhydrides, wherein the polyimide is halogenated and wherein the polyimide comprises a siloxane moiety, wherein the siloxane moiety is a portion of the polyimide polymer backbone;
wherein the polyimide is a copolymer formed from at least:
a first monomer, wherein the first monomer is 1,3-Bis (3-aminopropyl)-1,1,3,3-tetramethyl disiloxane;

a second monomer, wherein the second monomer is 4,4'-(Hexafluoroisopropylidene) diphthalic anhydride; and a third monomer, wherein the third monomer is 2,2-Bis(4-aminophenyl) hexafluoropropane; and wherein the molar ratio of 1,3-Bis(3-aminopropyl)-1,1,3,3-tetramethyl disiloxane to 2,2-Bis(4-aminophenyl) hexafluoropropane is from 9:1 to 1:9.

2. The coated glass article of claim 1, wherein the portion of the first surface of the coated glass container with the low-friction coating has a coefficient of friction of less than or equal to about 0.7.

3. The coated glass article of claim 2, wherein the coated glass article retains the coefficient of friction of less than or equal to about 0.7 following a heat treatment at a temperature of at least about 280° C. for 30 minutes.

4. The coated glass article of claim 1, wherein a light transmission through the coated glass article is greater than or equal to about 55% of a light transmission through an uncoated glass article for each wavelength from about 400 nm to about 700 nm.

5. The coated glass article of claim 4, wherein the coated glass article retains the light transmission through the coated glass article of greater than or equal to about 55% of the light transmission through the uncoated glass container for each wavelength from about 400 nm to about 700 nm following a heat treatment at a temperature of at least about 280° C. for 30 minutes.

6. The coated glass article of claim 1, wherein the low-friction coating has a mass loss of less than about 5% of its mass when heated from a temperature of 150° C. to 350° C. at a ramp rate of about 10° C./minute.

7. The coated glass article of claim 1, wherein the first surface is an exterior surface of the glass container.

8. The coated glass article of claim 1, wherein the low-friction coating comprises a coupling agent.

9. The coated glass article of claim 8, wherein the coupling agent comprises a urea-functionalized silane.

10. The coated glass article of claim 8, wherein the low-friction coating comprises:

a coupling agent layer in direct contact with the first surface of the glass container, the coupling agent layer comprising the coupling agent; and a polymer layer in direct contact with the coupling agent layer, the polymer layer comprising the polyimide.

11. The coated glass article of claim 1, wherein the glass article comprises ion-exchanged glass.

12. The coated glass article of claim 1, wherein at least 10 mol. % of the monomers that form the polyimide are amine terminated siloxanes.

13. The coated glass article of claim 1, wherein the coated glass article is a pharmaceutical package.

* * * * *